United States Patent
Murayama et al.

(10) Patent No.: US 12,222,718 B2
(45) Date of Patent: Feb. 11, 2025

(54) MARINE VESSEL MANEUVERING SYSTEM, AND MARINE VESSEL

(71) Applicant: YAMAHA HATSUDOKI KABUSHIKI KAISHA, Iwata (JP)

(72) Inventors: Takuya Murayama, Shizuoka (JP); Masaru Tamaki, Shizuoka (JP)

(73) Assignee: YAMAHA HATSUDOKI KABUSHIKI KAISHA, Shizuoka (JP)

( * ) Notice: Subject to any disclaimer, the term of this patent is extended or adjusted under 35 U.S.C. 154(b) by 252 days.

(21) Appl. No.: 18/102,115

(22) Filed: Jan. 27, 2023

(65) Prior Publication Data

US 2023/0259133 A1 Aug. 17, 2023

(30) Foreign Application Priority Data

Feb. 17, 2022 (JP) ................................ 2022-023224

(51) Int. Cl.
  *G05D 1/00* (2024.01)
  *B63H 25/02* (2006.01)

(52) U.S. Cl.
  CPC ........... *G05D 1/0206* (2013.01); *B63H 25/02* (2013.01)

(58) Field of Classification Search
  CPC .............................. G05D 1/0206; B63H 25/02
  See application file for complete search history.

(56) References Cited

U.S. PATENT DOCUMENTS

| 2005/0282447 | A1  | 12/2005 | Okuyama |
| 2017/0274973 | A1  | 9/2017  | Tamura et al. |
| 2018/0273152 | A1* | 9/2018  | Koyano ................. B63H 20/12 |

FOREIGN PATENT DOCUMENTS

| JP | 2006-001432 A | 1/2006 |
| JP | 2017-171263 A | 9/2017 |
| JP | 2018-158628 A | 10/2018 |

* cited by examiner

*Primary Examiner* — Paul Danneman
(74) *Attorney, Agent, or Firm* — Keating & Bennett, LLP

(57) ABSTRACT

A marine vessel maneuvering system able to improve operability when shifting a marine vessel to a pivot turning mode includes a rotatable operator to maneuver a marine vessel, and a controller configured or programmed to shift to a pivot turning mode in which the marine vessel is turned on the spot. In a rotation operation direction of the operator, a high friction region where a resistance of a rotation operation increases is set within a rotatable range of the operator. When the operator is rotated to the high-friction region, the controller is configured or programmed to shift the marine vessel to the pivot turning mode.

17 Claims, 16 Drawing Sheets

MARINE VESSEL MANEUVERING SYSTEM, AND MARINE VESSEL

CROSS REFERENCE TO RELATED APPLICATIONS

This application claims the benefit of priority to Japanese Patent Application No. 2022-023224, filed on Feb. 17, 2022. The entire contents of this application are hereby incorporated herein by reference.

BACKGROUND OF THE INVENTION

1. Field of the Invention

The present invention relates to a marine vessel maneuvering system, and a marine vessel.

2. Description of the Related Art

When a marine vessel comes alongside a pier in a marina or the like, it is sometimes required to pivot-turn the marine vessel on the spot in order to change the direction of the marine vessel. In order to meet such a need, in recent years, marine vessels are each set with a pivot turning mode that pivot-turns a hull of the marine vessel on the spot. In the pivot turning mode, when a wheel portion of a steering apparatus of the marine vessel is rotated, a propulsion device is controlled so as to pivot-turn the hull on the spot to a rotation operation direction of the wheel portion (for example, see Japanese Laid-Open Patent Publication (kokai) No. 2018-158628).

However, in order to shift the marine vessel to the pivot turning mode, a marine vessel user needs to temporarily stop the rotation operation of the wheel portion and operate a pivot turning switch located on the steering apparatus. In addition, the pivot turning switch is sometimes located away from the wheel portion, and in order to operate the pivot turning switch, the marine vessel user needs to take his/her hand off the wheel portion. Therefore, there is room for improvement in the operability of the pivot turning switch or the like for shifting the marine vessel to the pivot turning mode.

SUMMARY OF THE INVENTION

Preferred embodiments of the present invention provide marine vessel maneuvering systems and marine vessels that are each able to improve the operability when shifting a marine vessel to a pivot turning mode.

According to a preferred embodiment of the present invention, a marine vessel maneuvering system includes a rotatable operator to maneuver a marine vessel, and a controller configured or programmed to shift to a pivot turning mode in which the marine vessel is turned on the spot. In a rotation operation direction of the rotatable operator, a high friction region where a resistance of a rotation operation increases is set within a rotatable range of the operator. When the operator is rotated to the high-friction region, the controller is configured or programmed to shift the marine vessel to the pivot turning mode.

According to another preferred embodiment of the present invention, a marine vessel maneuvering system includes a rotatable operator to maneuver a marine vessel, and a controller configured or programmed to shift to a pivot turning mode in which the marine vessel is turned on the spot. The operator includes a lateral movement switch to shift the marine vessel to a lateral movement mode which moves the marine vessel in a lateral direction. When the operator is rotated by a predetermined rotation angle or more while the lateral movement switch is operated, the controller is configured or programmed to shift the marine vessel to the pivot turning mode.

According to another preferred embodiment of the present invention, a marine vessel maneuvering system includes a rotatable operator to maneuver a marine vessel, and a controller configured or programmed to shift the marine vessel to a predetermined movement mode. In a rotation operation direction of the rotatable operator, a high friction region where a resistance of a rotation operation increases is set within a rotatable range of the operator. When the operator is rotated to the high-friction region, the controller is configured or programmed to shift the marine vessel to the predetermined movement mode.

According to another preferred embodiment of the present invention, a marine vessel includes a rotatable operator to maneuver the marine vessel, and a controller configured or programmed to shift to a pivot turning mode in which the marine vessel is turned on the spot. In a rotation operation direction of the rotatable operator, a high friction region where a resistance of a rotation operation increases is set within a rotatable range of the operator. When the operator is rotated to the high-friction region, the controller is configured or programmed to shift the marine vessel to the pivot turning mode.

According to another preferred embodiment of the present invention, a marine vessel includes a rotatable operator to maneuver the marine vessel, and a controller configured or programmed to shift to a pivot turning mode in which the marine vessel is turned on the spot. The operator includes a lateral movement switch to shift the marine vessel to a lateral movement mode which moves the marine vessel in a lateral direction. When the operator is rotated by a predetermined rotation angle or more while the lateral movement switch is operated, the controller is configured or programmed to shift the marine vessel to the pivot turning mode.

According to another preferred embodiment of the present invention, a marine vessel includes a rotatable operator to maneuver the marine vessel, and a controller configured or programmed to shift the marine vessel to a predetermined movement mode. In a rotation operation direction of the rotatable operator, a high friction region where a resistance of a rotation operation increases is set within a rotatable range of the operator. When the operator is rotated to the high-friction region, the controller is configured or programmed to shift the marine vessel to the predetermined movement mode.

According to a preferred embodiment of the present invention, when the rotatable operator is rotated to the high friction region, or when the operator is rotated by the predetermined rotation angle or more while the lateral movement switch included in the operator is operated, the marine vessel is shifted to the pivot turning mode without stopping the rotation operation of the operator and without the marine vessel user taking his/her hand off the operator. Therefore, it is possible to improve the operability when shifting the marine vessel to the pivot turning mode.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Hereinafter, preferred embodiments of the present invention will be described with reference to the drawings.

First, a first preferred embodiment of the present invention will be described.

Figure 1:
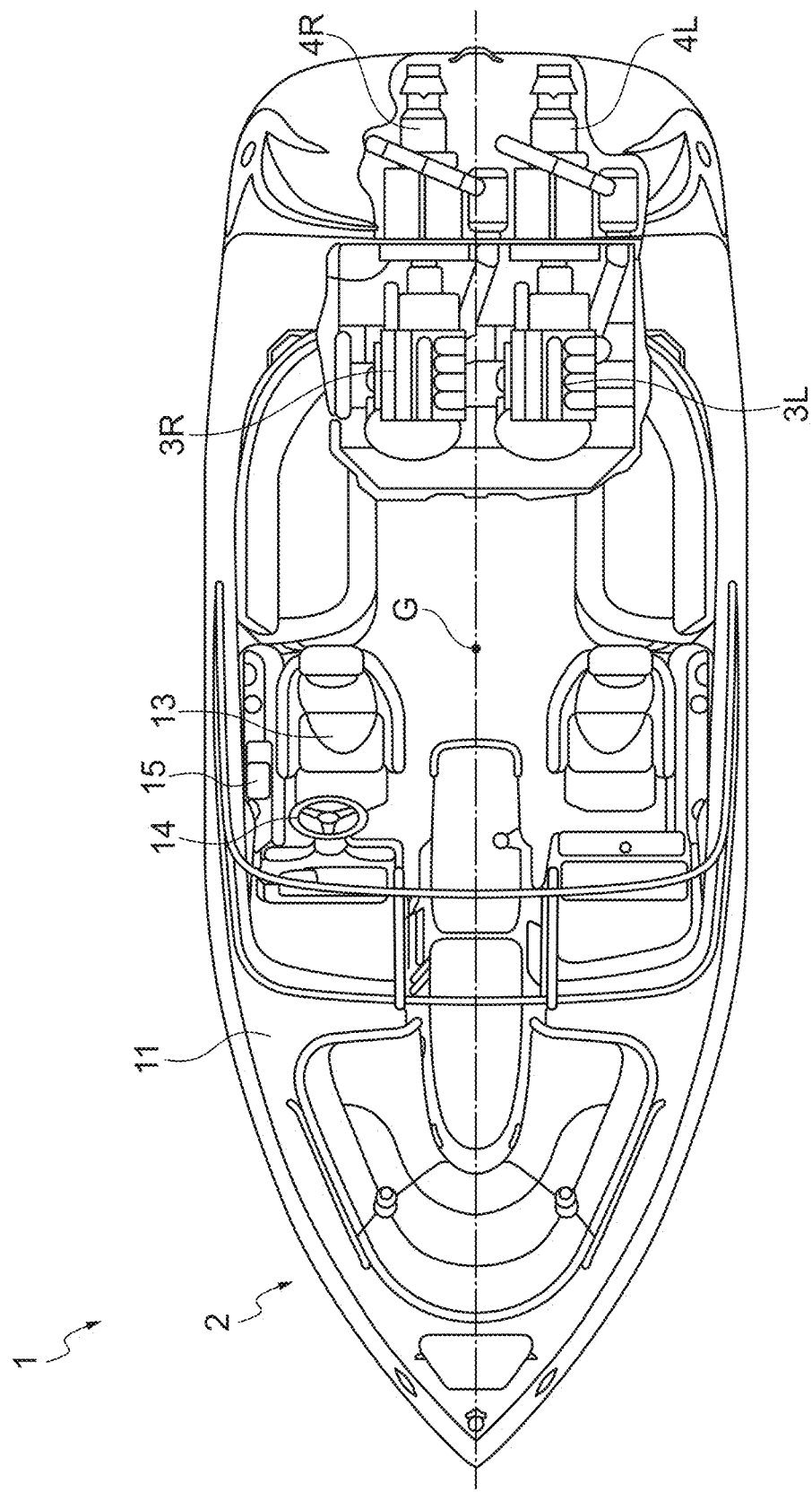
FIG. 1 is a plan view of a marine vessel according to a first preferred embodiment of the present invention.
Figure 2:
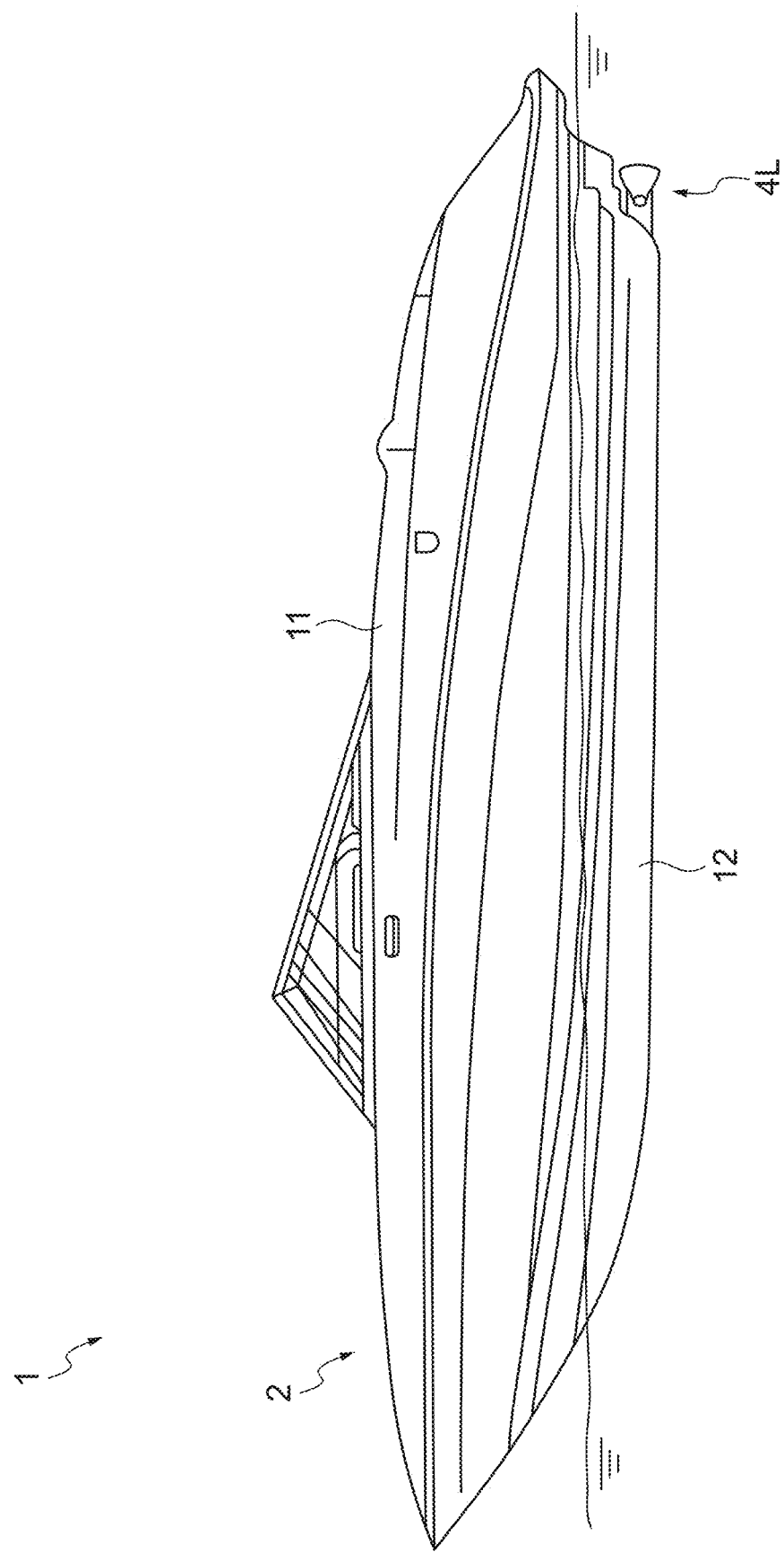
FIG. 2 is a side view of the marine vessel according to the first preferred embodiment of the present invention.

FIG. 1 is a plan view of a marine vessel according to the first preferred embodiment of the present invention. Marine vessel maneuvering systems according to preferred embodiments of the present invention are each preferably applied to a marine vessel 1. FIG. 1 shows a portion of an internal configuration of the marine vessel 1. FIG. 2 is a side view of the marine vessel 1. The marine vessel 1 is, for example, a jet propulsion boat, and is such a marine vessel called a jet boat or a sports boat.

The marine vessel 1 includes a hull 2, engines 3L and 3R, and marine vessel propulsion devices 4L and 4R. The hull 2 includes a deck 11 and a hull 12. The hull 12 is located below the deck 11. A maneuvering seat 13 is located on the deck 11. A steering apparatus 14 (an operator or operating device) to change a traveling direction (a moving direction) of the marine vessel 1 to the left or the right, and a remote control unit 15 to control the traveling direction and a vessel speed of the marine vessel 1 are located near the maneuvering seat 13.

The engine 3L is located on the port side of the hull 2, and the engine 3R is located on the starboard side of the hull 2. The marine vessel propulsion device 4L is located on the port side of the hull 2 so as to correspond to the engine 3L, and the marine vessel propulsion device 4R is located on the starboard side of the hull 2 so as to correspond to the engine 3R. An output shaft of the engine 3L is connected to the marine vessel propulsion device 4L, and an output shaft of the engine 3R is connected to the marine vessel propulsion device 4R. The marine vessel propulsion device 4L and the marine vessel propulsion device 4R are driven by the engine 3L and the engine 3R, respectively, and generate a propulsive force that moves the hull 2. In the marine vessel 1, the number of the engines is not limited to two, and may be three or more, and the number of the marine vessel propulsion devices is not limited to two, and may be three or more. It should be noted that in the preferred embodiments of the present invention, a reference numeral "L" indicates that it is located on the port side of the hull 2, and a reference numeral "R" indicates that it is located on the starboard side of the hull 2.

Figure 3:
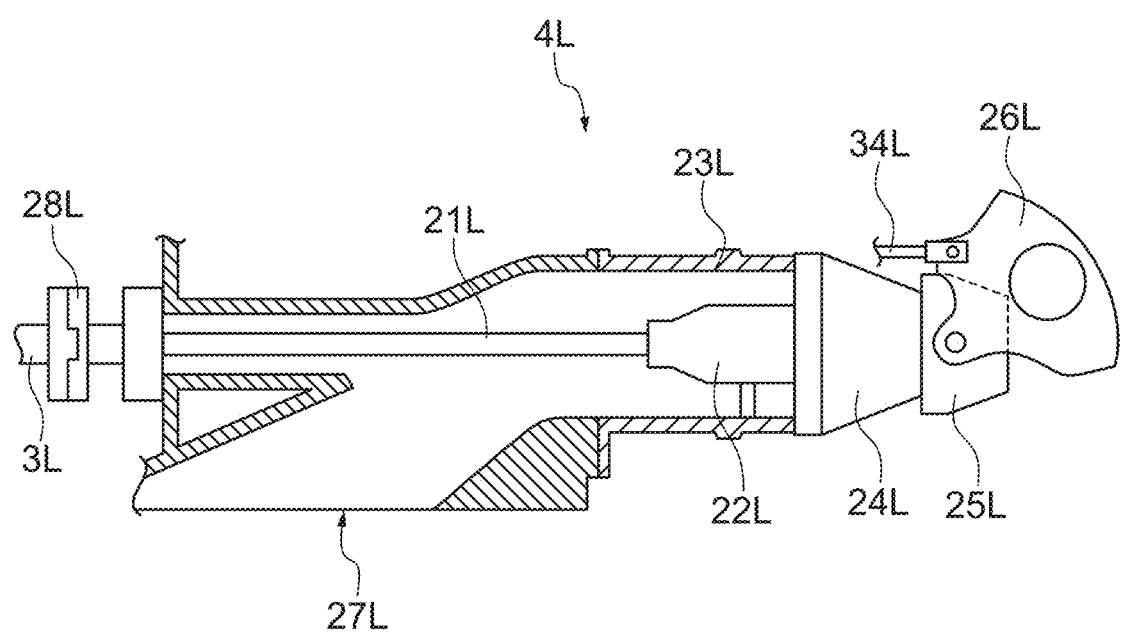
FIG. 3 is a schematic side view that shows a configuration of a marine vessel propulsion device in FIG. 1.

FIG. 3 is a schematic side view that shows a configuration of the marine vessel propulsion device 4L. In FIG. 3, a portion of the marine vessel propulsion device 4L is shown in a cross section. The marine vessel propulsion device 4L is a jet propulsion device that sucks in water around the hull 2 and jets it out. Since the marine vessel propulsion device 4R has the same configuration as the marine vessel propulsion device 4L, the description of the configuration of the marine vessel propulsion device 4R is omitted.

As shown in FIG. 3, the marine vessel propulsion device 4L includes an impeller shaft 21L, an impeller 22L, an impeller housing 23L, a nozzle 24L, a deflector 25L, a reverse bucket 26L, and a water suction portion 27L. The impeller shaft 21L extends in a front-rear direction of the hull 2. A front portion of the impeller shaft 21L is connected to the output shaft of the engine 3L via a coupling 28L. A rear portion of the impeller shaft 21L is located inside the impeller housing 23L, and the impeller housing 23L is located behind the water suction portion 27L, which is an opening. The nozzle 24L is located behind the impeller housing 23L.

The impeller 22L is attached to the rear portion of the impeller shaft 21L. The impeller 22L is located inside the impeller housing 23L. The impeller 22L rotates together with the impeller shaft 21L and sucks the water from the water suction portion 27L. The impeller 22L jets the sucked in water rearward from the nozzle 24L.

The deflector 25L is located behind the nozzle 24L. The reverse bucket 26L is located behind the deflector 25L. The deflector 25L changes a jetting direction of the water jetted from the nozzle 24L to the left or the right. A steering actuator 32L is connected to the deflector 25L. When the steering actuator 32L changes the direction of the deflector 25L to the left or the right in response to a rotation operation of a wheel portion 19 (described below) of the steering apparatus 14, the traveling direction of the marine vessel 1 is changed to the left or the right.

The reverse bucket 26L is able to be switched between a forward position, a reverse position, and a neutral position. When the reverse bucket 26L is in the forward position, since the reverse bucket 26L does not cover the deflector 25L, the water jetted from the nozzle 24L through the deflector 25L is jetted backward. As a result, the marine vessel 1 moves forward. When the reverse bucket 26L is in the reverse position, since the reverse bucket 26L covers the deflector 25L, the water jetted from the nozzle 24L through the deflector 25L is reflected by the reverse bucket 26L, and the jetting direction of the jetted water is changed forward. As a result, the marine vessel 1 moves backward.

The neutral position of the reverse bucket 26L exists between the forward position and the reverse position. Since the reverse bucket 26L covers a portion of the deflector 25L in the neutral position, the amount of the water jetted backward from the nozzle 24L through the deflector 25L is reduced, and the propulsive force that moves the hull 2 forward is reduced. As a result, either the hull 2 is slowed down or the hull 2 is held at a stopped position.

Figure 4:
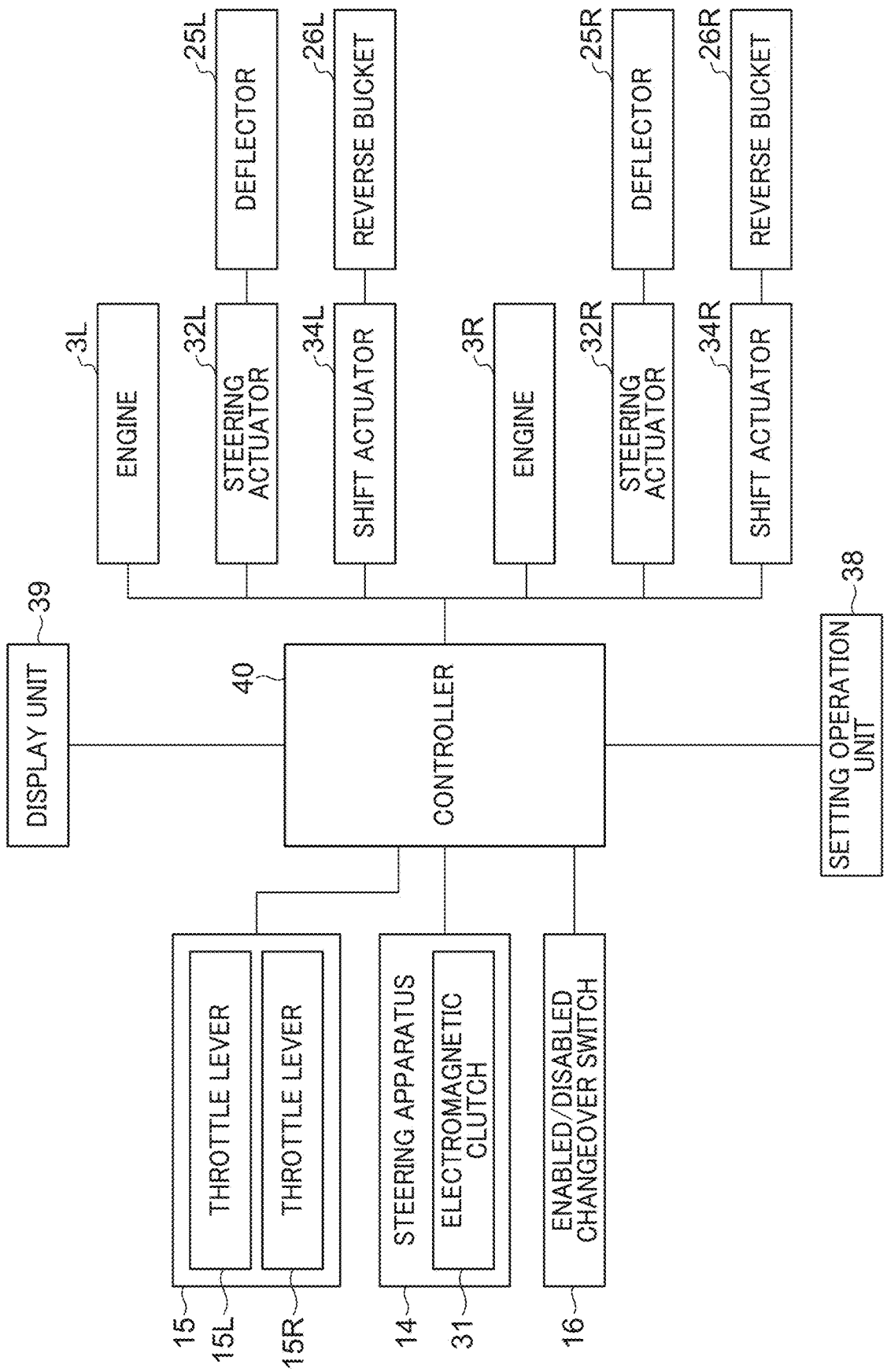
FIG. 4 is a block diagram of a control system of a marine vessel including a marine vessel maneuvering system according to the first preferred embodiment of the present invention.

Next, a control system of the marine vessel 1 will be described. FIG. 4 is a block diagram of the control system of the marine vessel 1 including a marine vessel maneuvering system according to the first preferred embodiment of the present invention.

As shown in FIG. 4, the marine vessel maneuvering system according to the first preferred embodiment of the present invention includes the steering apparatus 14, the remote control unit 15, and a controller 40 (a controller). The controller 40 includes a processor (not shown) such as a CPU (Central Processing Unit) and storage devices (not shown) such as a RAM (Random Access Memory) and a ROM (Read Only Memory), and controls the marine vessel 1 by executing stored programs. The controller 40 may be a single control unit, or may be a plurality of control units. The controller 40 is communicably connected to the steering apparatus 14.

The marine vessel maneuvering system of the marine vessel 1 (the marine vessel maneuvering system according to the first preferred embodiment of the present invention) includes the steering actuator 32L and a shift actuator 34L. The controller 40 is communicably connected to the engine 3L, the steering actuator 32L, and the shift actuator 34L. The steering actuator 32L includes, for example, an electric motor. Alternatively, the steering actuator 32L may be another actuator such as a hydraulic cylinder. The shift actuator 34L is connected to the reverse bucket 26L of the marine vessel propulsion device 4L. By moving forward and backward, the shift actuator 34L switches the position of the reverse bucket 26L between the forward position, the reverse position, and the neutral position. The shift actuator 34L includes, for example, an electric motor. Alternatively, the shift actuator 34L may be another actuator such as a hydraulic cylinder.

The marine vessel maneuvering system of the marine vessel 1 includes a steering actuator 32R and a shift actuator 34R. The controller 40 is communicably connected to the engine 3R, the steering actuator 32R, and the shift actuator 34R. The steering actuator 32R and the shift actuator 34R have the same configurations as the steering actuator 32L and the shift actuator 34L, respectively.

The remote control unit 15 includes a throttle lever 15L and a throttle lever 15R. The throttle lever 15L and the throttle lever 15R are operable in a forward moving direction and in a backward moving direction from a zero operation position (the neutral position), respectively. The controller 40 detects an operation amount of the throttle lever 15L and an operation amount of the throttle lever 15R by using a sensor (not shown) of the remote control unit 15, controls a rotational speed of the engine 3L in response to the operation amount of the throttle lever 15L, and controls a rotational speed of the engine 3R in response to the operation amount of the throttle lever 15R. Thus, the vessel speed of the marine vessel 1 is adjusted. In addition, the controller 40 controls the shift actuator 34L in response to an operation direction of the throttle lever 15L, and controls the shift actuator 34R in response to an operation direction of the throttle lever 15R. As a result, switching between forward moving and backward moving of the marine vessel 1 is performed.

The marine vessel maneuvering system of the marine vessel 1 includes a display unit 39 and a setting operation unit 38. The display unit 39 includes a display and displays various kinds of information based on instructions from the controller 40. The setting operation unit 38 includes an operation element (not shown) operated by a marine vessel user, a setting operation element (not shown) to perform various kinds of settings, and an inputting operation element (not shown) to input various kinds of instructions. Signals inputted by the setting operation unit 38 are transmitted to the controller 40. The marine vessel 1 includes an enabled/disabled changeover switch 16, which may be, for example, a push-down button located on the maneuvering seat 13 or elsewhere. The function of the enabled/disabled changeover switch 16 will be described below.

Figure 5:
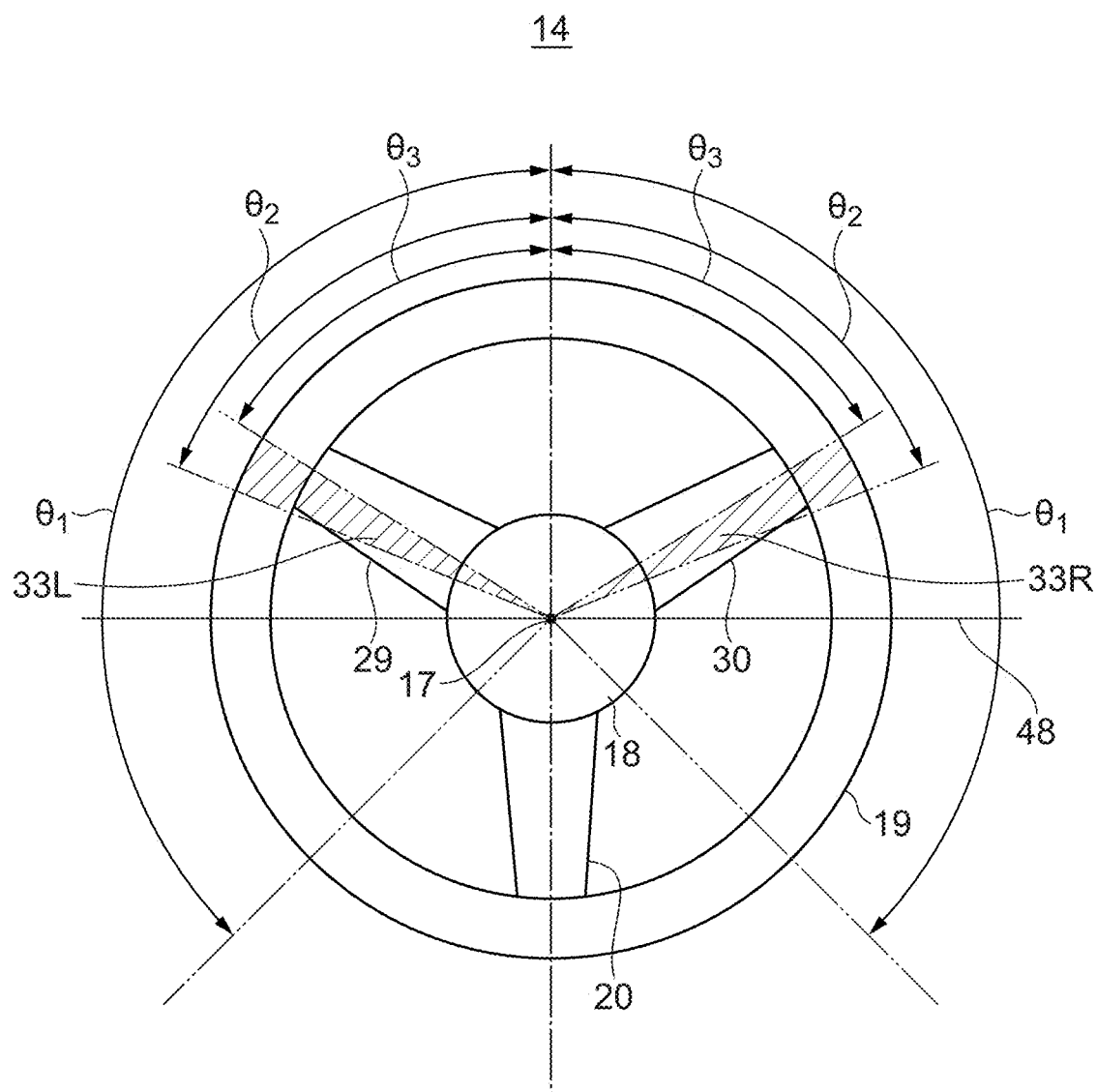
FIG. 5 is a view for explaining a configuration of a steering apparatus according to the first preferred embodiment of the present invention.

FIG. 5 is a view for explaining a configuration of the steering apparatus 14, and shows a case in which the steering apparatus 14 is viewed from the side of the marine vessel user. It should be noted that a vertical direction and a left/right direction of FIG. 5 correspond to a vertical direction and a left/right direction of the marine vessel 1, the depth side of FIG. 5 is the bow side of the marine vessel 1, and the front side of FIG. 5 is the stern side of the marine vessel 1.

As shown in FIG. 5, the steering apparatus 14 includes a central portion 18 that is supported rotatably around a rotation fulcrum 17 with respect to a column portion (not shown), the wheel portion 19 (a handle portion) that has an annular shape, and, for example, three spoke portions (spoke portions 20, 29, and 30) that connect the central portion 18 and the wheel portion 19. The wheel portion 19 is a portion that is gripped by the marine vessel user. The steering apparatus 14 is provided with an electromagnetic clutch mechanism 31 that is located in the column portion and connects a steering shaft (not shown) and the central portion 18.

In the steering apparatus 14, when the wheel portion 19 is at a position that makes the marine vessel 1 move straight ahead, that is, when a rotation angle of the wheel portion 19 is 0° (hereinafter, referred to as "a straight-ahead state"), the spoke portion 20 is positioned below a virtual plane 48 extending through the rotation fulcrum 17 and parallel to the left/right direction, and extends downward from the rotation fulcrum 17.

When the wheel portion 19 is in the straight-ahead state, the spoke portion 29 is positioned above the virtual plane 48, and extends from the central portion 18 so as to be positioned within an angle range from about 0° to about 60°, for example, clockwise with respect to the virtual plane 48 in a circumferential direction about the rotation fulcrum 17, preferably, so as to be positioned within an angle range from about 20° to about 40°, for example, clockwise with respect to the virtual plane 48 in the circumferential direction about the rotation fulcrum 17.

When the wheel portion 19 is in the straight-ahead state, the spoke portion 30 is positioned above the virtual plane 48, and extends from the central portion 18 so as to be positioned within an angle range from about 0° to about 60°, for example, counterclockwise with respect to the virtual plane 48 in the circumferential direction about the rotation fulcrum 17, preferably, so as to be positioned within an angle range from about 20° to about 40°, for example, counterclockwise with respect to the virtual plane 48 in the circumferential direction about the rotation fulcrum 17.

When the wheel portion 19 is rotated clockwise from the straight-ahead state, the steering apparatus 14 transmits a rotation operation signal indicating the rotation angle of the wheel portion 19 to the controller 40 in response to the rotation operation, and the controller 40 that has received the rotation operation signal changes the direction of a deflector 25R and the direction of the deflector 25L by the steering actuator 32R and the steering actuator 32L, respectively, and changes the traveling direction of the marine vessel 1 to the right by an amount corresponding to the rotation angle of the wheel portion 19. When the wheel portion 19 is rotated counterclockwise from the straight-ahead state, the steering apparatus 14 transmits a rotation operation signal indicating the rotation angle of the wheel portion 19 to the controller 40 in response to the rotation operation, and the controller 40 that has received the rotation operation signal changes the direction of the deflector 25R and the direction of the deflector 25L by the steering actuator 32R and the steering actuator 32L, respectively, and changes the traveling direction of the marine vessel 1 to the left by an amount corresponding to the rotation angle of the wheel portion 19.

Next, various kinds of marine vessel maneuvering modes will be described. The marine vessel maneuvering modes are roughly divided into "high-speed modes" and "low-speed modes". The low-speed modes include a pivot turning mode, which will be described below.

The high-speed mode is a mode used to make the marine vessel 1 navigate at a relatively high speed in the open sea. In the high-speed mode, both a rotation number of the engine 3L and a rotation number of the engine 3R are allowed up to a maximum rotation number. In addition, in the high-speed mode, an operable rotation angle θ1 of the wheel portion 19 of the steering apparatus 14 is set to be relatively large, and the wheel portion 19 is set to be able to rotated up to, for example, about 135° both clockwise and counterclockwise in FIG. 5 from the straight-ahead state.

The low-speed mode is a mode used to make the marine vessel 1 navigate at a relatively low speed when moving within a harbor or when fishing. In the low-speed mode, both the upper limit of the rotation number of the engine 3L and the upper limit of the rotation number of the engine 3R are limited to a predetermined rotation number lower than the maximum rotation number. In addition, in the low-speed mode, an operable rotation angle θ2 of the wheel portion 19 of the steering apparatus 14 is set to be relatively small, and the wheel portion 19 is set to be able to rotated up to, for example, about 67.5° both clockwise and counterclockwise in FIG. 5 from the straight-ahead state.

Switching between the high-speed mode and the low-speed mode is performed in response to the operation of the enabled/disabled changeover switch 16. For example, when the marine vessel user presses down the enabled/disabled changeover switch 16, the enabled/disabled changeover switch 16 transmits a pressing-down operation signal to notify that the enabled/disabled changeover switch 16 has been pressed down to the controller 40, and the controller 40 that has received the pressing-down operation signal performs the switching between the high-speed mode and the low-speed mode by controlling the engine 3L and the engine 3R. In the first preferred embodiment, the switching between the high-speed mode and the low-speed mode is performed each time the enabled/disabled changeover switch 16 is pressed down. It should be noted that the enabled/disabled changeover switch 16 may be a rotary switch instead of a push-down button. In this case, the switching between the high-speed mode and the low-speed mode is performed each time the enabled/disabled changeover switch 16 is rotated.

In the first preferred embodiment, a rotatable range of the wheel portion 19 in the low-speed mode is provided with high friction regions 33L and 33R (see hatched regions in FIG. 5) where the resistance of the rotation operation increases. Specifically, when the wheel portion 19 is rotated by a rotation angle θ3 or more each of clockwise and counterclockwise from the straight-ahead state, the rotational resistance of the wheel portion 19 becomes larger than the resistance of the rotation operation when the rotation angle of the wheel portion 19 is smaller than the rotation angle θ3 (hereinafter, referred to as "the resistance of the usual rotation operation"). Here, the rotation angle θ3 is an angle smaller than the rotation angle θ2, and is set to, for example, about 57.5°. Therefore, as an example, rotation angles of the high friction regions 33L and 33R are each set to about 10°. It should be noted that the rotation angle of the high friction region is not limited to about 10°, and may be changed in response to the specifications, etc. of the steering apparatus 14.

When the rotation angle of the wheel portion 19 becomes larger than the rotation angle θ3 and the wheel portion 19 is rotated to the high friction region 33R (33L), the steering apparatus 14 transmits a rotation operation signal, which indicates that the wheel portion 19 has reached the high friction region 33R (33L), to the controller 40. The controller 40 that has received the rotation operation signal, which indicates that the wheel portion 19 has reached the high friction region 33R (33L), adjusts a slip ratio, etc. in the electromagnetic clutch mechanism 31 to increase the resistance of the rotation operation of the wheel portion 19, and shifts the marine vessel 1 to the pivot turning mode. The pivot turning mode is a mode in which the hull 2 is rotated in a yaw direction around the center of gravity G (see FIG. 1) of the marine vessel 1, that is, a mode in which the marine vessel 1 is turned on the spot. The pivot turning mode is realized by the controller 40 changing the operations of the steering actuators 32L and 32R and the shift actuators 34L and 34R corresponding to the rotation operation of the wheel portion 19 from the operations other than the pivot turning mode.

FIGS. 6A to 6F are figures for explaining shifting to the pivot turning mode in the first preferred embodiment of the present invention. It should be noted that in FIGS. 6A and 6B, in order to facilitate understanding of the rotation angle of the wheel portion 19, a position 35 indicating the 12 o'clock direction of the wheel portion 19 in the straight-ahead state (hereinafter, referred to as "a reference position 35") is indicated by a black line.

Figure 6A:
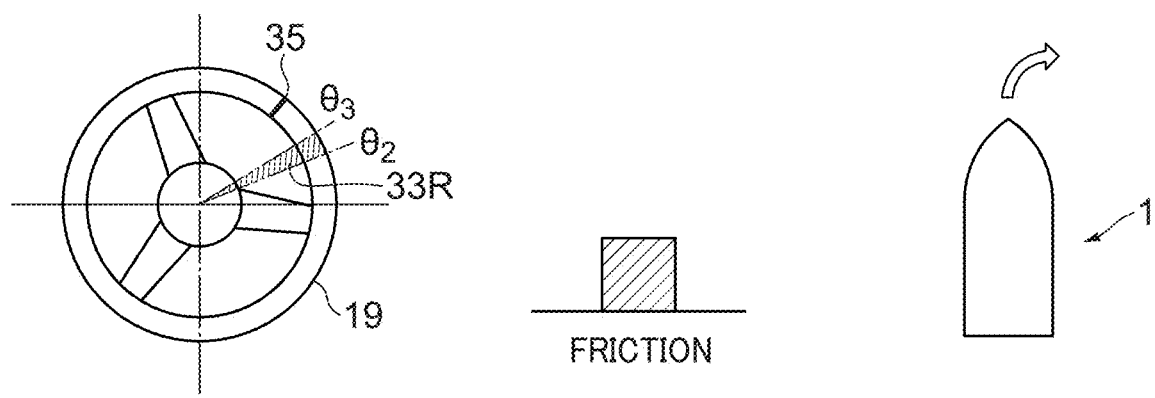
FIGS. 6A to 6F are figures for explaining shifting to a pivot turning mode according to the first preferred embodiment of the present invention.

First, as shown in FIG. 6A, in the case in which the rotation angle of the wheel portion 19 is smaller than the rotation angle θ3 and the reference position 35 of the wheel portion 19 has not reached the high friction region 33R, as indicated by a hatched bar in FIG. 6A, since the friction (the resistance) of the rotation operation remains relatively small and the marine vessel 1 is not shifted to the pivot turning mode, the marine vessel 1 does not rotate around the center of gravity G in response to the rotation operation of the wheel portion 19, and the traveling direction of the marine vessel 1 is changed to the right (see an arrow in FIG. 6A).

Figure 6B:
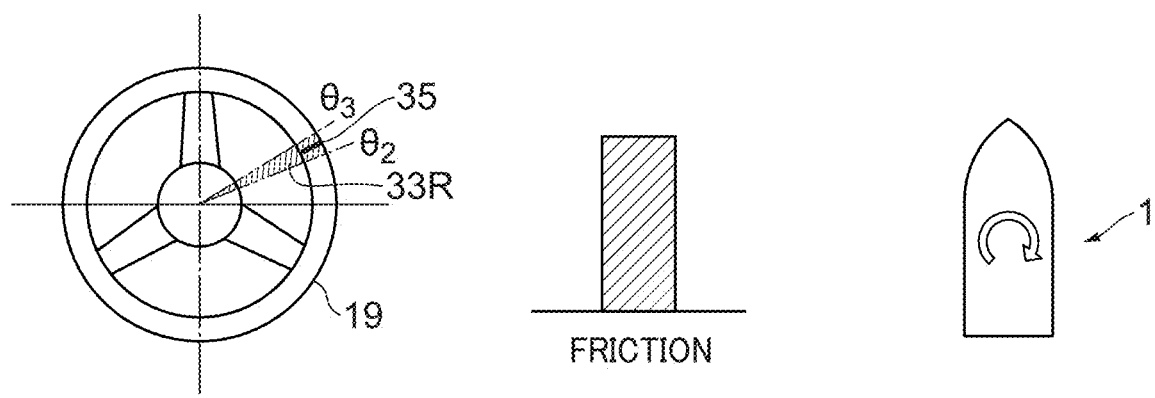

On the other hand, as shown in FIG. 6B, in the case in which the rotation angle of the wheel portion 19 becomes larger than or equal to the rotation angle θ3 and the reference position 35 is included in the high friction region 33R, as indicated by a hatched bar in FIG. 6B, since the friction of the rotation operation becomes relatively large and the marine vessel 1 is shifted to the pivot turning mode, the marine vessel 1 rotates around the center of gravity G in response to the rotation operation of the wheel portion 19 (see an arrow in FIG. 6B).

Figure 6C:
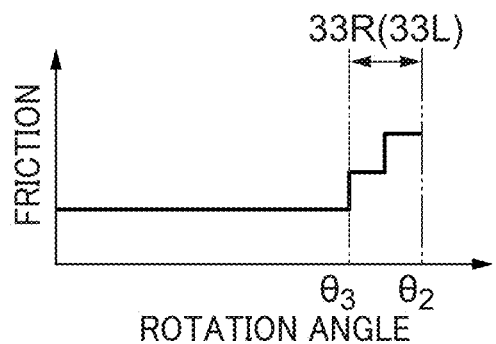
Figure 6D:
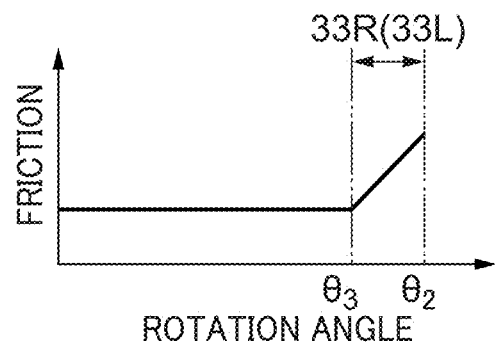

Moreover, in the high friction region 33R (33L), the friction of the rotation operation, and a turning speed (a rotational speed) of the marine vessel 1 do not need to be constant. For example, as shown in FIG. 6C, in the high friction region 33R (33L), the magnitude of the friction of the rotation operation may be set in two stages, and the friction of the rotation operation may be set to increase as the rotation angle of the wheel portion 19 increases. Furthermore, as shown in FIG. 6D, in the high friction region 33R (33L), the friction of the rotation operation may be set to increase in proportion to the magnitude of the rotation angle of the wheel portion 19.

Figure 6E:
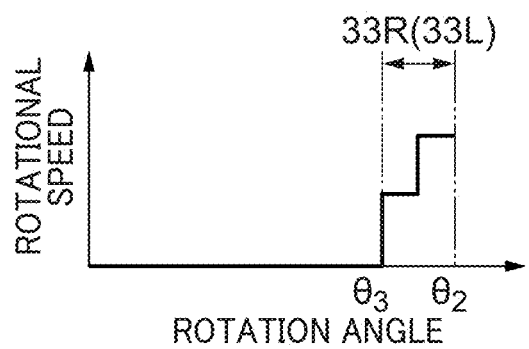
Figure 6F:
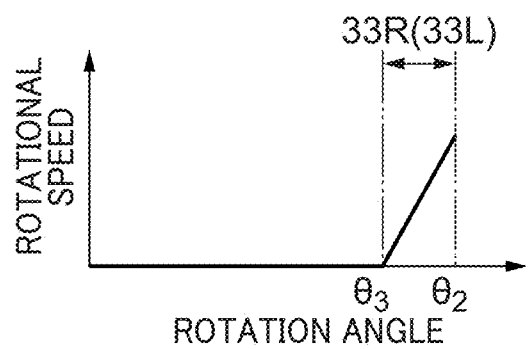

Moreover, as shown in FIG. 6E, in the high friction region 33R (33L), the magnitude of the turning speed (the rotational speed) of the marine vessel 1 may be set in two stages, and the turning speed of the marine vessel 1 may be set to increase as the rotation angle of the wheel portion 19 increases. Furthermore, as shown in FIG. 6F, in the high friction region 33R (33L), the turning speed of the marine vessel 1 may be set to increase in proportion to the magnitude of the rotation angle of the wheel portion 19. In this way, in the case in which the turning speed of the marine vessel 1 increases as the rotation angle of the wheel portion 19 increases, as described above, in the high friction region 33R (33L), it is preferable to set the friction of the rotation operation to increase as the rotation angle of the wheel portion 19 increases. As a result, the marine vessel user is able to notice that the turning speed of the marine vessel 1 is increasing due to the increase in the rotational resistance of the wheel portion 19.

Although the case in which the wheel portion 19 is rotated clockwise from the straight-ahead state has been described with reference to FIGS. 6A to 6F, the same processes are performed in the case in which the wheel portion 19 is rotated counterclockwise from the straight-ahead state.

In the first preferred embodiment, the high friction region 33R (33L) is set only in the low-speed mode, and the high friction region 33R (33L) is not set in the high-speed mode. Therefore, in the case in which the marine vessel user does not want to shift to the pivot turning mode by operating the enabled/disabled changeover switch 16, the marine vessel user is able to shift the marine vessel 1 to the high-speed mode and forcibly eliminate the high friction region 33R (33L). Furthermore, a cancel switch (not shown), different from the enabled/disabled changeover switch 16, may be provided to cancel shifting to the pivot turning mode while maintaining the low-speed mode. When the marine vessel user operates the cancel switch, the controller 40 eliminates the high friction region 33R (33L) while keeping the marine vessel 1 in the low-speed mode. The cancel switch may be an individual switch located on the maneuvering seat 13 or elsewhere, or may be a touch button displayed on a touch panel of the display unit 39.

In the first preferred embodiment, in the high friction region 33R (33L), not only when the wheel portion 19 is rotated so that the rotation angle of the wheel portion 19 increases, but also when the wheel portion 19 is rotated so that the rotation angle of the wheel portion 19 decreases, the resistance of the rotation operation is set to become larger than the resistance of the usual rotation operation. However, in the high friction region 33R (33L), although the resistance of the rotation operation becomes larger than the resistance of the usual rotation operation when the wheel portion 19 is rotated so that the rotation angle of the wheel portion 19 increases, when the wheel portion 19 is rotated so that the rotation angle of the wheel portion 19 decreases, the resistance of the rotation operation may be set to be the same as the resistance of the usual rotation operation and not to increase.

According to the first preferred embodiment, when the wheel portion 19 is rotated to the high friction region 33R (33L), since the controller 40 shifts the marine vessel 1 to the pivot turning mode, it is possible to shift the marine vessel 1 to the pivot turning mode without stopping the rotation operation of the wheel portion 19 and without the marine vessel user taking his/her hand off the wheel portion 19. Therefore, it is possible to improve the operability when shifting the marine vessel 1 to the pivot turning mode.

In the first preferred embodiment, since the marine vessel 1 shifts to the pivot turning mode after the wheel portion 19 is rotated to the high friction region 33R (33L), the marine vessel user who rotates the wheel portion 19 is able to notice that the marine vessel 1 has shifted to the pivot turning mode due to the increased rotational resistance of the wheel portion 19.

Moreover, in the first preferred embodiment, in order to make the wheel portion 19 reach the high friction region 33R (33L), the marine vessel user needs to intentionally increase a rotation force of the wheel portion 19. Therefore, it is possible to prevent the marine vessel user from unintentionally shifting the marine vessel 1 to the pivot turning mode.

A notification device such as a buzzer or a lamp, which notifies that the marine vessel 1 has shifted to the pivot turning mode when the marine vessel 1 shifts to the pivot turning mode, may be provided in the maneuvering seat 13 or the steering apparatus 14. In this case as well, the marine vessel user is able to notice that the marine vessel 1 has shifted to the pivot turning mode due to notification by the buzzer or the lamp, for example, due to sounding from the buzzer or flashing of the lamp.

Figure 7:
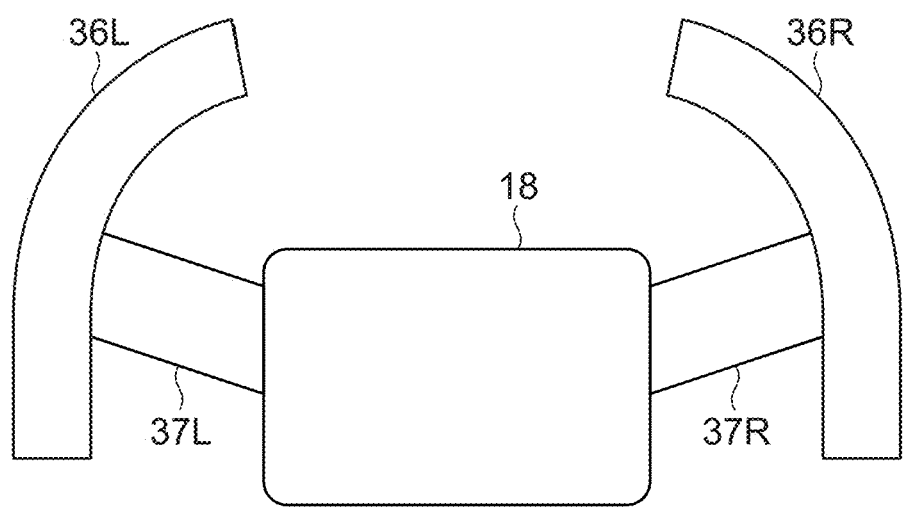
FIG. 7 is a view for explaining a configuration of a modification example of the steering apparatus according to the first preferred embodiment of the present invention.

In the first preferred embodiment, although the steering apparatus 14 includes the wheel portion 19 having the annular shape, instead of the wheel portion 19 having the annular shape, a steering apparatus may be provided with handlebars 36R and 36L that are located on the right and the left, respectively (see FIG. 7). In this case, the handlebar 36R is connected to the central portion 18 by a spoke portion 37R, and the handlebar 36L is connected to the central portion 18 by a spoke portion 37L. It should be noted that the high friction region 33R (33L) same as that of the steering apparatus 14 is also set in this steering apparatus.

Figure 8:
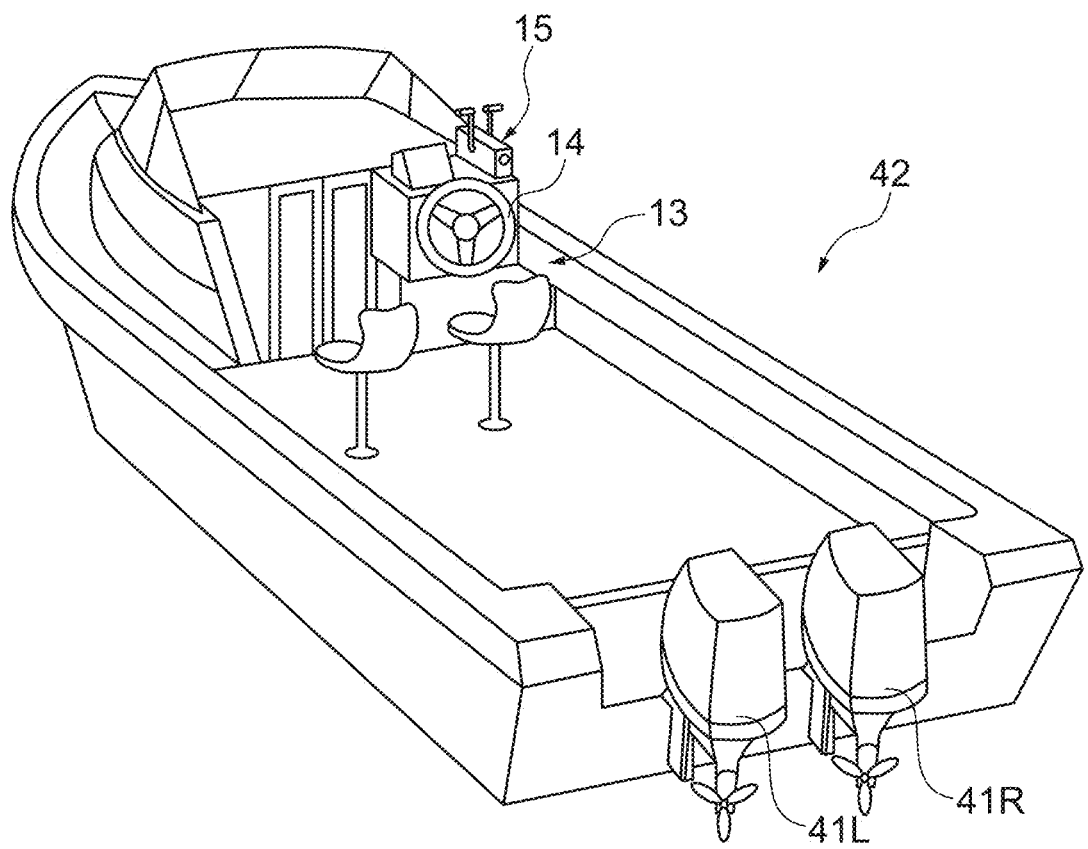
FIG. 8 is a perspective view of a modification example of the marine vessel according to the first preferred embodiment of the present invention.

Further, the marine vessel maneuvering system according to the first preferred embodiment not only is applied to the jet propulsion boat including the marine vessel propulsion devices 4L and 4R, but also may be applied to a planing boat 42 including outboard motors 41R and 41L which is shown in FIG. 8. In the planing boat, an operable rotation angle of the wheel portion 19 is larger than the rotation angle of the jet propulsion boat, for example, the wheel portion 19 is set to be able to rotated up to, for example, about 540° (one and a half rotations) both clockwise and counterclockwise in FIG. 5 from the straight-ahead state, and in this case, the high friction region 33R (33L) is set within a range of the rotation angle about 530° to about 540°.

Next, a second preferred embodiment of the present invention will be described. Although the second preferred embodiment differs from the first preferred embodiment in that the second preferred embodiment uses a joystick instead of a steering apparatus as an operating device, since the components, operations, and effects of the second preferred embodiment are basically the same as those of the first preferred embodiment described above except for the use of a joystick, the description of duplicated components, operations, and effects will be omitted, and different components, operations, and effects will be described below.

Figure 9:
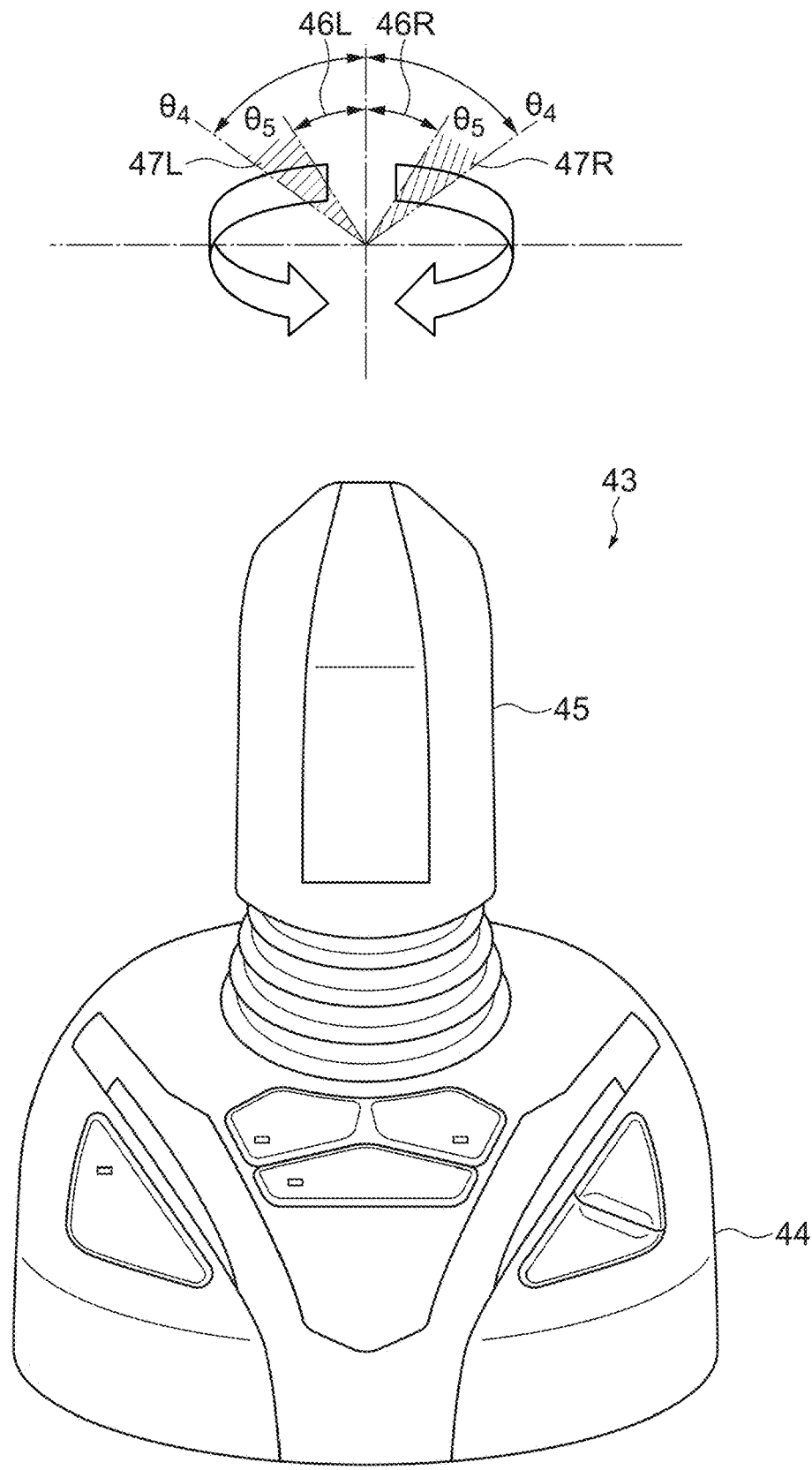
FIG. 9 is a view for explaining a configuration of a joystick used in a second preferred embodiment of the present invention.

FIG. 9 is a view for explaining a configuration of a joystick used in the second preferred embodiment of the present invention. A joystick 43 in FIG. 9 is an operating device to maneuver the marine vessel 1, and it is possible to maneuver the marine vessel 1 by the joystick 43 only when the marine vessel 1 shifts to the low-speed mode.

As shown in FIG. 9, the joystick 43 includes a base 44 and a rod-shaped stick 45 attached to the top of the base 44. The stick 45 is able to swing freely with respect to the base 44 so that the marine vessel user is able to intuitively perform maneuvering of the marine vessel 1. For example, when the marine vessel user tilts the stick 45 forward or backward, the joystick 43 transmits a signal to move the marine vessel 1 forward or backward to the controller 40, and when the marine vessel user tilts the stick 45 leftward or rightward, the joystick 43 transmits a signal to move the marine vessel 1 leftward or rightward to the controller 40. In addition, the joystick 43 transmits a signal to generate a thrust corresponding to a tilting amount of the stick 45 to the controller 40. Therefore, the marine vessel user is able to maneuver the marine vessel 1 by operating the stick 45.

The stick 45 is able to be twisted (rotated) with respect to the base 44 (see arrows in FIG. 9). When the marine vessel user twists (rotates) the stick 45, the joystick 43 transmits a signal to turn the marine vessel 1 to the controller 40. Upon receiving the signal to turn the marine vessel 1, the controller 40 shifts the marine vessel 1 to the pivot turning mode, and rotates the hull 2 around the center of gravity G in the yaw direction.

However, if the marine vessel user carelessly touches the joystick 43 and the stick 45 is twisted, sometimes the marine vessel 1 will turn against the intention of the marine vessel user, thus, the stick 45 is provided with dead regions with respect to a rotation operation direction of the stick 45. Specifically, in the joystick 43, the stick 45 is set to be able to rotated up to a rotation angle θ4 both clockwise and counterclockwise from a state where a rotation angle of the stick 45 is 0° (hereinafter, referred to as "a reference state"), and a range from the reference state to a rotation angle θ5 clockwise and a range from the reference state to the rotation angle θ5 counterclockwise are set as dead regions 46R and 46L. Here, the rotation angle θ5 is smaller than the rotation angle θ4. In the case in which the rotation angle of the stick 45 is included in the dead region 46R (46L) even if the stick 45 is rotated, the joystick 43 does not transmit the signal to turn the marine vessel 1 to the controller 40, and thus the marine vessel 1 does not turn.

In addition, in the joystick 43, a range from the rotation angle θ5 to the rotation angle θ4 clockwise and a range from the rotation angle θ5 to the rotation angle θ4 counterclockwise are set as high friction regions 47R and 47L (see hatched regions in FIG. 9). In the high friction region 47R (47L), the rotational resistance of the stick 45 becomes larger than the resistance of the rotation operation of the stick 45 in the dead region 46R (46L) (hereinafter, referred to as "the resistance of the rotation operation in the dead region"). As an example, rotation angles of the high friction regions 47L and 47R are each set to about 10°.

When the stick 45 is rotated and the rotation angle of the stick 45 becomes larger than the rotation angle θ5 and the stick 45 is rotated to the high friction region 47R (47L), the steering apparatus 14 transmits a rotation operation signal, which indicates that the stick 45 has reached the high friction region 47R (47L), to the controller 40. Upon receiving the rotation operation signal indicating that the stick 45 has reached the high friction region 47R (47L), the controller 40 adjusts a motor (not shown), or the like, connected to the stick 45 to increase the resistance of the rotation operation of the stick 45, and shifts the marine vessel 1 to the pivot turning mode.

FIGS. 10A to 10F are figures for explaining shifting to the pivot turning mode in the second preferred embodiment of the present invention. It should be noted that in FIGS. 10A and 10B, in order to facilitate understanding of the rotation angle of the stick 45, a position 49 indicating the 12 o'clock direction of the stick 45 in the reference state (hereinafter, referred to as "a reference position 49") is indicated by a black line.

Figure 10A:
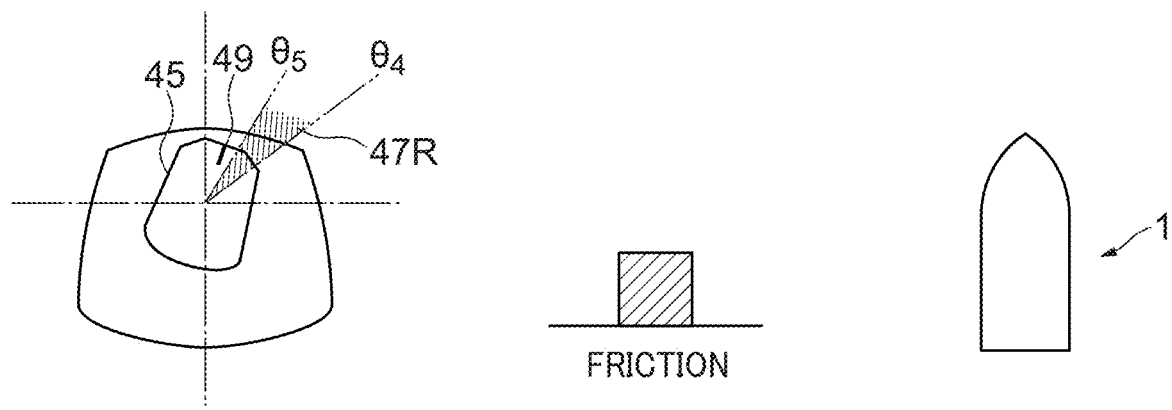
FIGS. 10A to 10F are figures for explaining shifting to the pivot turning mode according to the second preferred embodiment of the present invention.

First, as shown in FIG. 10A, in the case in which the rotation angle of the stick 45 is smaller than the rotation angle θ5 and the reference position 49 of the stick 45 has not reached the high friction region 47R, as indicated by a hatched bar in FIG. 10A, since the friction of the rotation operation remains relatively small and the marine vessel 1 is not shifted to the pivot turning mode, the marine vessel 1 does not turn.

Figure 10B:
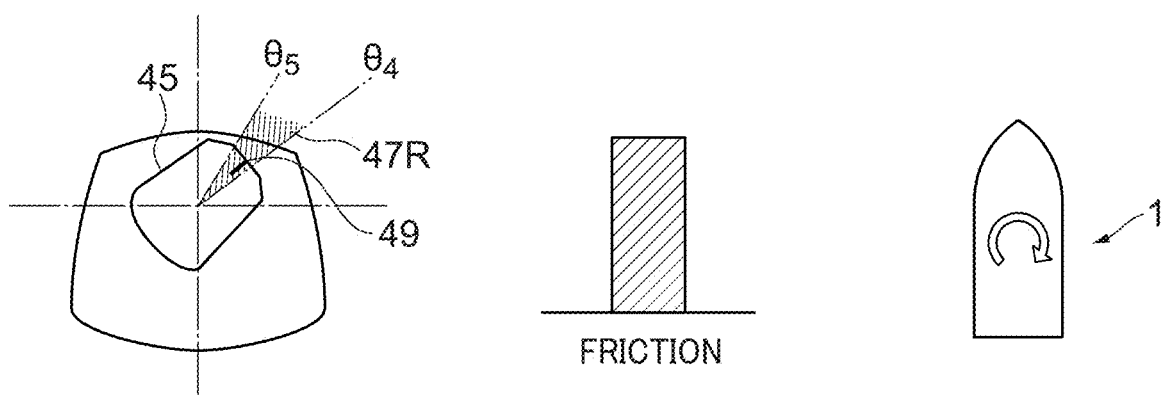

On the other hand, as shown in FIG. 10B, in the case in which the rotation angle of the stick 45 becomes larger than or equal to the rotation angle θ5 and the reference position 49 is included in the high friction region 47R, as indicated by a hatched bar in FIG. 10B, since the friction of the rotation operation becomes relatively large and the marine vessel 1 is shifted to the pivot turning mode, the marine vessel 1 rotates around the center of gravity G in response to the rotation operation of the stick 45 (see an arrow in FIG. 10B).

Figure 10C:
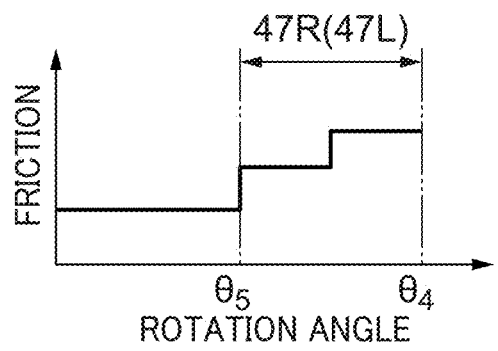
Figure 10D:
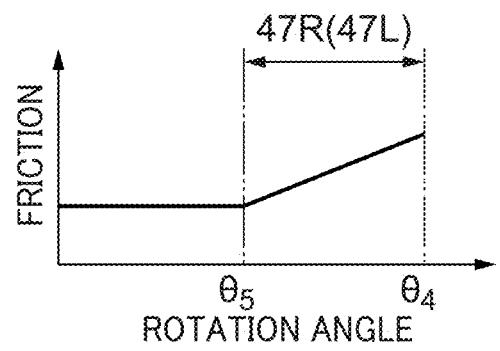

Moreover, in the high friction region 47R (47L), the friction of the rotation operation, and the turning speed (the rotational speed) of the marine vessel 1 do not need to be constant. For example, as shown in FIG. 10C, in the high friction region 47R (47L), the magnitude of the friction of the rotation operation may be set in two stages, and the friction of the rotation operation may be set to increase as the rotation angle of the stick 45 increases. Furthermore, as shown in FIG. 10D, in the high friction region 47R (47L), the friction of the rotation operation may be set to increase in proportion to the magnitude of the rotation angle of the stick 45.

Figure 10E:
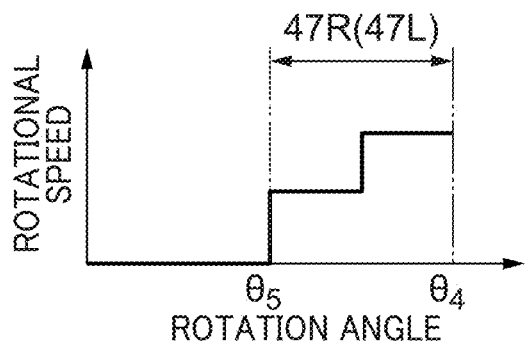
Figure 10F:
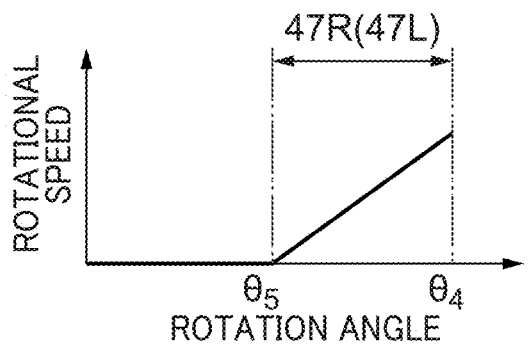

Moreover, as shown in FIG. 10E, in the high friction region 47R (47L), the magnitude of the turning speed (the rotational speed) of the marine vessel 1 may be set in two stages, and the turning speed of the marine vessel 1 may be set to increase as the rotation angle of the stick 45 increases. Furthermore, as shown in FIG. 10F, in the high friction region 47R (47L), the turning speed of the marine vessel 1 may be set to increase in proportion to the magnitude of the rotation angle of the stick 45.

Although the case in which the stick 45 is rotated clockwise from the reference state has been described with reference to FIGS. 10A to 10F, the same processes are performed in the case in which the stick 45 is rotated counterclockwise from the reference state. In addition, as with the first preferred embodiment, in the case in which the marine vessel user does not want to shift to the pivot turning mode, by operating the enabled/disabled changeover switch 16 or the cancel switch, the marine vessel user is able to forcibly eliminate the high friction region 47R (47L). Moreover, as with the first preferred embodiment, in the high friction region 47R (47L), not only when the stick 45 is rotated so that the rotation angle of the stick 45 increases, but also when the stick 45 is rotated so that the rotation angle of the stick 45 decreases, the resistance of the rotation operation is set to become larger than the resistance of the rotation operation in the dead region. Moreover, as with the first preferred embodiment, in the high friction region 47R (47L), only when the stick 45 is rotated so that the rotation angle of the stick 45 increases, the resistance of the rotation operation may be set to become larger than the resistance of the rotation operation in the dead region.

According to the second preferred embodiment, since the dead region 46R (46L) is set with respect to the rotation operation direction of the stick 45, in the case in which the rotation angle of the stick 45 is included in the dead region 46R (46L) even if the marine vessel user carelessly twists the stick 45, the marine vessel 1 does not turn.

In the second preferred embodiment, since the marine vessel 1 shifts to the pivot turning mode after the stick 45 is rotated to the high friction region 47R (47L), the marine vessel user who rotates the stick 45 is able to notice that the marine vessel 1 has shifted to the pivot turning mode due to the increased rotational resistance of the stick 45.

Moreover, in the second preferred embodiment, in order to shift the marine vessel 1 to the pivot turning mode, since the marine vessel user needs to intentionally increase a rotation force of the stick 45 and make the stick 45 reach the high friction region 47R (47L), it is possible to prevent the marine vessel user from unintentionally shifting the marine vessel 1 to the pivot turning mode.

Next, a third preferred embodiment of the present invention will be described. Although the third preferred embodiment differs from the first preferred embodiment in that the third preferred embodiment includes a lateral movement switch to shift the marine vessel 1 to a lateral movement mode, since the components, operations, and effects of the third preferred embodiment are basically the same as those of the first preferred embodiment described above except for including a lateral movement switch to shift the marine vessel 1 to a lateral movement mode, the description of duplicated components, operations, and effects will be omitted, and different components, operations, and effects will be described below.

Figure 11:
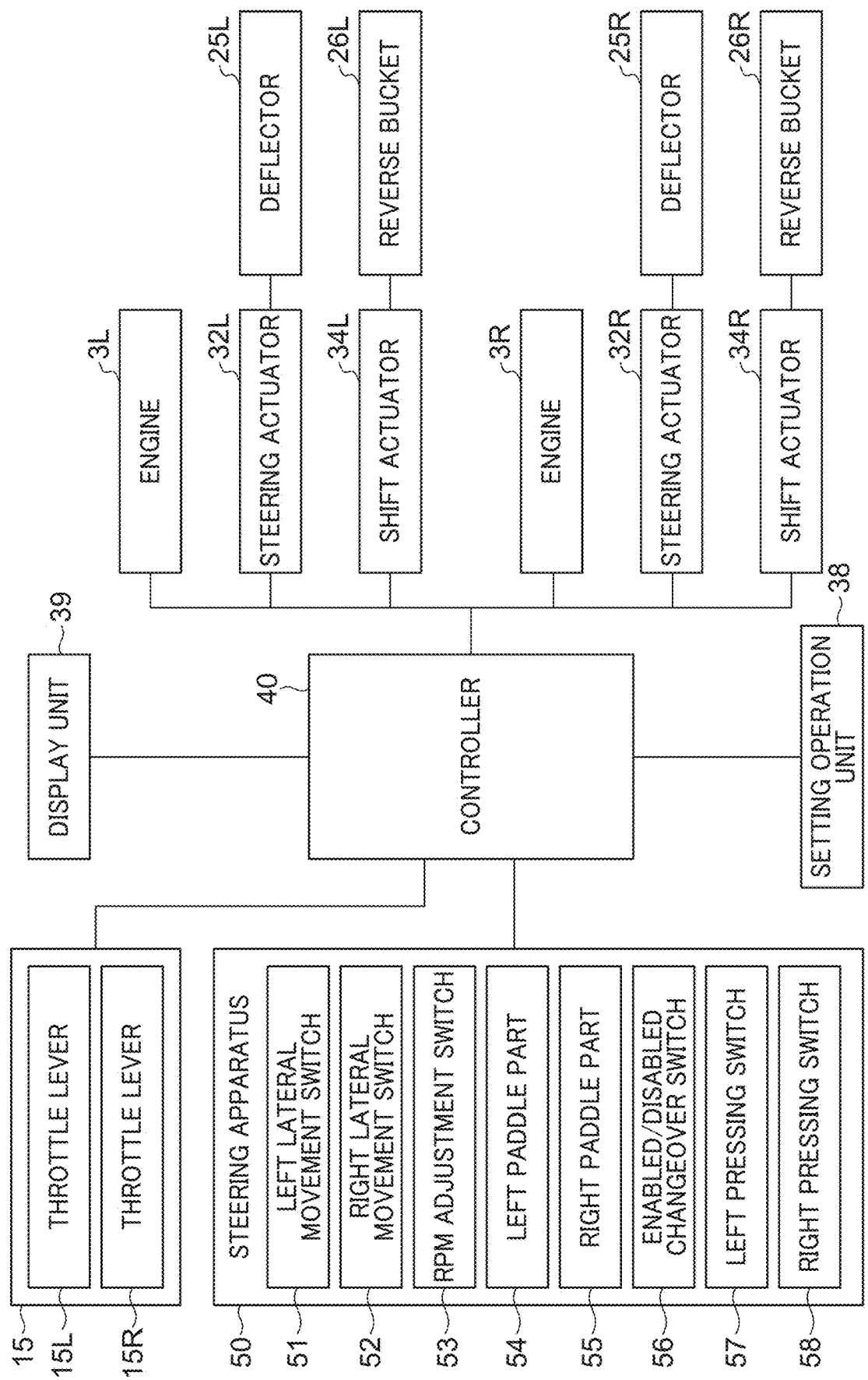
FIG. 11 is a block diagram of a control system of a marine vessel including a marine vessel maneuvering system according to a third preferred embodiment of the present invention.

FIG. 11 is a block diagram of a control system of the marine vessel 1 including a marine vessel maneuvering system according to the third preferred embodiment of the present invention.

As shown in FIG. 11, the marine vessel maneuvering system according to the third preferred embodiment of the present invention includes a steering apparatus 50, the remote control unit 15, the setting operation unit 38, the display unit 39, the controller 40, the steering actuators 32R and 32L, and the shift actuators 34R and 34L. In addition, the steering apparatus 50 includes a left lateral movement switch 51, a right lateral movement switch 52, an RPM (revolutions per minute) adjustment switch 53, a left paddle 54, a right paddle 55, an enabled/disabled changeover switch 56, a left pressing switch 57, and a right pressing switch 58. The switches 51, 52, 53, 56, 57, and 58, and the paddles 54 and 55 are operated by the marine vessel user, and operation signals of the switches 51, 52, 53, 56, 57, and 58, and the paddles 54 and 55 are supplied to the controller 40. Functions and arrangements of the switches 51, 52, 53, 56, 57, and 58, and the paddles 54 and 55 will be described below.

In the third preferred embodiment, the low-speed modes include not only the pivot turning mode, but also lateral thrust generation modes, which will be described below, and the lateral thrust generation modes include lateral movement modes and pressing modes.

Each of the lateral thrust generation modes (the lateral movement modes and the pressing modes) is a mode which generates a thrust that moves the hull 2 in a lateral direction. Among the lateral movement modes, a left lateral movement mode and a right lateral movement mode are modes that control the marine vessel propulsion devices 4L and 4R so as to laterally move the hull 2 leftward and rightward, respectively. Further, among the pressing modes, a left pressing mode and a right pressing mode are modes that control the marine vessel propulsion devices 4L and 4R so that the hull 2 comes alongside a docking place such as a pier and a state in which the hull 2 is pressed against the docking place is maintained. The lateral movement modes and the pressing modes are common in that the thrust to move the hull 2 in the lateral direction acts on the hull 2.

Here, lateral moving means that the hull 2 moves in a horizontal direction without rotating in the yaw direction around the center of gravity G. For example, in the lateral movement modes without turning, the center of gravity G of the hull 2 moves leftward or rightward.

Figure 12:
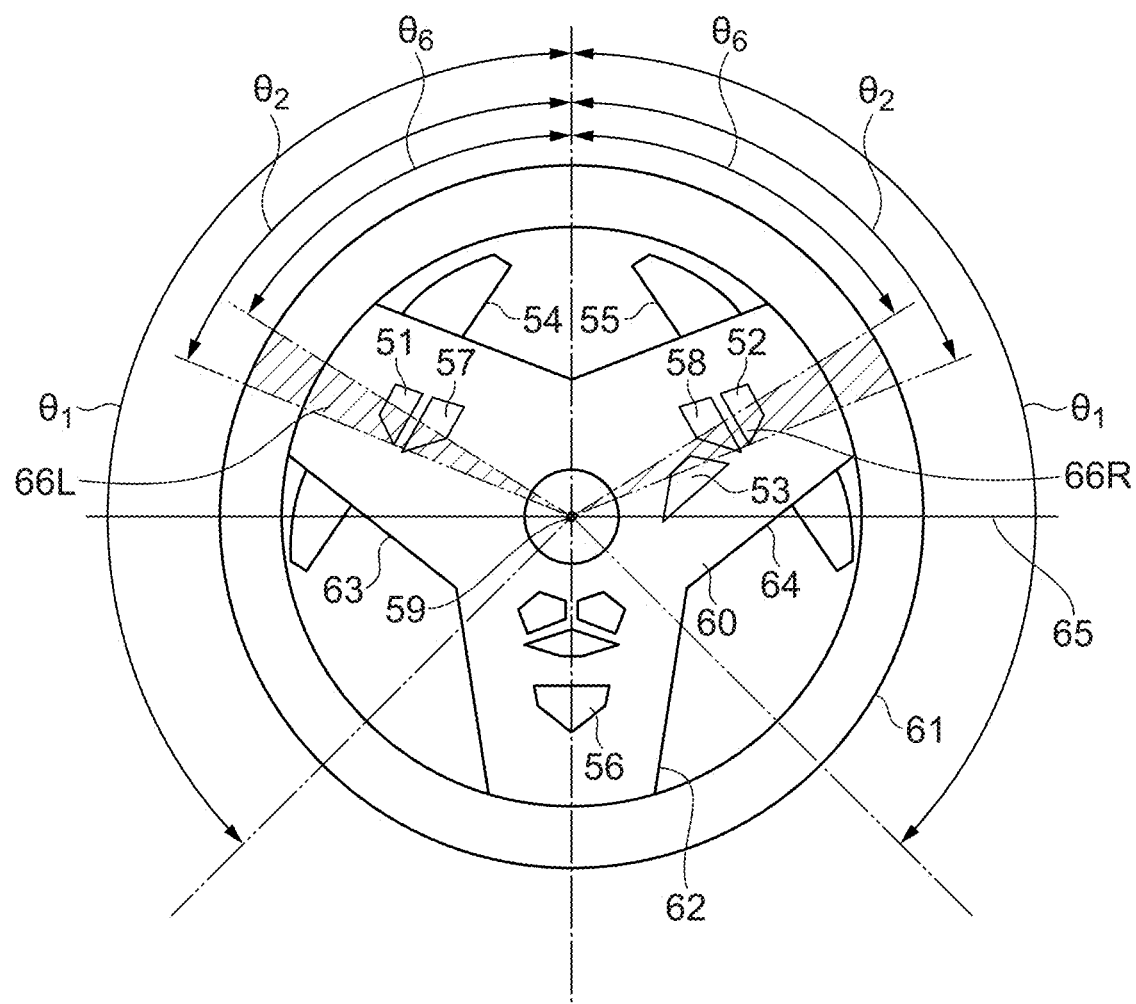
FIG. 12 is a view for explaining a configuration of a steering apparatus according to the third preferred embodiment of the present invention.

FIG. 12 is a view for explaining a configuration of the steering apparatus 50, and shows a case in which the steering apparatus 50 is viewed from the side of the marine vessel user. It should be noted that a vertical direction and a left/right direction of FIG. 12 correspond to the vertical direction and the left/right direction of the marine vessel 1, the depth side of FIG. 12 is the bow side of the marine vessel 1, and the front side of FIG. 12 is the stern side of the marine vessel 1. Since the steering apparatus 50 has substantially the same configuration and functions as the steering apparatus 14 in the first preferred embodiment, only different configurations and functions will be described below.

As shown in FIG. 12, the steering apparatus 50 includes a central portion 60 that is supported rotatably around a rotation fulcrum 59 with respect to a column portion (not shown), a wheel portion 61 that has an annular shape, and, for example, three spoke portions (spoke portions 62, 63, and 64) that connect the central portion 60 and the wheel portion 61.

In the steering apparatus 50, when the wheel portion 61 is in the straight-ahead state, the spoke portion 62 is positioned below a virtual plane 65 extending through the rotation fulcrum 59 and parallel to the left/right direction, and extends downward from the rotation fulcrum 59. In addition, when the wheel portion 61 is in the straight-ahead state, the spoke portion 63 is positioned above the virtual plane 65, and extends from the central portion 60 so as to be positioned within an angle range from about 0° to about 60°, for example, clockwise with respect to the virtual plane 65 in a circumferential direction about the rotation fulcrum 59, preferably, so as to be positioned within an angle range from about 20° to about 40°, for example, clockwise with respect to the virtual plane 65 in the circumferential direction about the rotation fulcrum 59. In addition, when the wheel portion 61 is in the straight-ahead state, the spoke portion 64 is positioned above the virtual plane 65, and extends from the central portion 60 so as to be positioned within an angle range from about 0° to about 60°, for example, counterclockwise with respect to the virtual plane 65 in the circumferential direction about the rotation fulcrum 59, preferably, so as to be positioned within an angle range from about 20° to about 40°, for example, counterclockwise with respect to the virtual plane 65 in the circumferential direction about the rotation fulcrum 59.

In the steering apparatus 50, the left lateral movement switch 51 and the left pressing switch 57 are located on the spoke portion 63. In addition, the right lateral movement switch 52, the right pressing switch 58, and the RPM adjustment switch 53 are located on the spoke portion 64. Moreover, the enabled/disabled changeover switch 56 is located on the spoke portion 62.

The left paddle 54 is located closer to the bow side of the marine vessel 1 than the spoke portion 63 so as to overlap the spoke portion 63 when viewed from the marine vessel user. The right paddle 55 is located closer to the bow side of the marine vessel 1 than the spoke portion 64 so as to overlap the spoke portion 64 when viewed from the marine vessel user. The left paddle 54 and the right paddle 55 are freely rotatable (movable) in the front-rear direction. The left paddle 54 and the right paddle 55 are rotated forward (rearward of the hull 2) with respect to initial positions by being operated by the marine vessel user, and return to the initial positions when hands operating the left paddle 54 and the right paddle 55 are released. The left paddle 54 and the right paddle 55 rotate integrally with the wheel portion 61 around the rotation fulcrum 59.

In the steering apparatus 50, the left paddle 54 and the right paddle 55 are usually operated while the wheel portion 61 is gripped by the marine vessel user. The left lateral movement switch 51 is located at a position where the marine vessel user is able to operate the left lateral movement switch 51 with a finger of a hand operating the left paddle 54 while gripping the wheel portion 61. Moreover, the right lateral movement switch 52 is located at a position where the marine vessel user is able to operate the right lateral movement switch 52 with a finger of a hand operating the right paddle 55 while gripping the wheel portion 61.

In the third preferred embodiment, in the high-speed mode, the controller 40 changes the traveling direction of the hull 2 in response to the operation of the wheel portion 61. The steering apparatus 50 outputs an operation signal indicating the operation position of the wheel portion 61 to the controller 40. The controller 40 controls the steering actuators 32L and 32R in response to the operation of the wheel portion 61. As a result, the traveling direction of the hull 2 is changed to the left or the right. In addition, in the low-speed mode, the controller 40 controls the marine vessel propulsion devices 4L and 4R based on the operation signals of the switches 51, 52, 53, 57, and 58 and the operation signals of the left paddle 54 and the right paddle 55.

The left paddle 54 is operable to issue an instruction to cause a backward thrust to be applied to the hull 2, and the right paddle 55 is operable to issue an instruction to cause a forward thrust to be applied to the hull 2. In the low-speed mode, the controller 40 instructs to apply a thrust corresponding to operation amounts of the left paddle 54 and the right paddle 55 to the hull 2. In addition, the functions of the switches 51, 52, 53, 57, and 58 become enabled in the low-speed mode.

The left lateral movement switch 51, the right lateral movement switch 52, the left pressing switch 57, and the right pressing switch 58 are mode switches to select or activate the lateral thrust generation modes. In particular, the left lateral movement switch 51 and the right lateral movement switch 52 are the mode switches to select or activate the lateral movement modes, and are switches to continue to generate a thrust in the lateral direction with respect to the hull 2 while being operated by the marine vessel user. The controller 40 controls the marine vessel propulsion devices 4L and 4R in response to operation inputs to the left lateral movement switch 51 and the right lateral movement switch 52 to execute the lateral movement modes.

The left pressing switch 57 and the right pressing switch 58 are the mode switches to select or activate the pressing modes, and are switches to generate the thrust in the lateral direction with respect to the hull 2 in response to being operated by the marine vessel user. The controller 40 controls the marine vessel propulsion devices 4L and 4R in response to operation inputs to the left pressing switch 57 and the right pressing switch 58 to execute the pressing modes.

The RPM adjustment switch 53 switches the rotation number of the engine 3L and the rotation number of the engine 3R between at least two stages (for example, low and high). Switching of the rotation number of the engine 3L and the rotation number of the engine 3R is applied to each mode of the low-speed modes. The stages of the rotation number of the engine 3L and the rotation number of the engine 3R that are switchable are set in advance for each mode.

The enabled/disabled changeover switch 56 has the same function as the enabled/disabled changeover switch 16 of the first preferred embodiment, and also in the third preferred embodiment, the switching between the high-speed mode and the low-speed mode is performed in response to the operation of the enabled/disabled changeover switch 56. Therefore, the enabled/disabled changeover switch 56 is a switch to switch enabling/disabling the functions of the switches 51, 52, 53, 57, and 58 enabled in the low-speed mode.

In addition, as with the steering apparatus 14, in the steering apparatus 50, an operable rotation angle of the wheel portion 61 in the high-speed mode is set to a relatively large rotation angle θ1, and an operable rotation angle of the wheel portion 61 in the low-speed mode is set to a relatively small rotation angle θ2.

The third preferred embodiment has such a configuration, that is, in the low-speed mode, when the marine vessel user rotates the wheel portion 61 while operating the left lateral movement switch 51 or the right lateral movement switch 52, the marine vessel 1 shifts from the lateral movement mode to the pivot turning mode. Specifically, a range from a rotation angle θ6 (a predetermined rotation angle) to the rotation angle θ2 clockwise of the wheel portion 61 and a range from the rotation angle θ6 to the rotation angle θ2 counterclockwise of the wheel portion are set as pivot turning regions 66R and 66L (see hatched regions in FIG. 12). It should be noted that the rotation angle θ6 is smaller than the rotation angle θ2 and rotation angles of the pivot turning regions 66R and 66L defined by the rotation angle θ6 and the rotation angle θ2 are each set to, for example, about 10°.

In the case in which the marine vessel user rotates the wheel portion 61 while operating the left lateral movement switch 51 or the right lateral movement switch 52, when a rotation angle of the wheel portion 61 is smaller than the rotation angle θ6, the steering apparatus 50 transmits the operation signal of the left lateral movement switch 51 or the right lateral movement switch 52 and a rotation operation signal of the wheel portion 61 to the controller 40. Upon receiving the operation signal of the left lateral movement switch 51 or the right lateral movement switch 52 and the rotation operation signal of the wheel portion 61, the controller 40 shifts the marine vessel 1 to the lateral movement mode and moves the marine vessel 1 in the lateral direction.

Then, when the rotation angle of the wheel portion 61 becomes larger than or equal to the rotation angle θ6 due to the rotation operation of the marine vessel user who operates the left lateral movement switch 51 or the right lateral movement switch 52 and the wheel portion 61 is rotated to the pivot turning region 66R (66L), the steering apparatus 50 transmits a rotation operation signal, which indicates that the wheel portion 61 has reached the pivot turning region 66R (66L), to the controller 40. Upon receiving the rotation operation signal indicating that the wheel portion 61 has reached the pivot turning region 66R (66L), the controller 40 shifts the marine vessel 1 to the pivot turning mode.

FIGS. 13A to 13D are figures for explaining shifting from the lateral movement mode to the pivot turning mode in the third preferred embodiment of the present invention. It should be noted that in FIGS. 13A and 13B, in order to facilitate understanding of the rotation angle of the wheel portion 61, a position 67 indicating the 12 o'clock direction of the wheel portion 61 in the straight-ahead state (hereinafter, referred to as "a reference position 67") is indicated by a black line. In addition, in FIGS. 13A to 13D, it is assumed that the right lateral movement switch 52 is operated, and the state in which the right lateral movement switch 52 is operated is indicated by hatching.

Figure 13A:
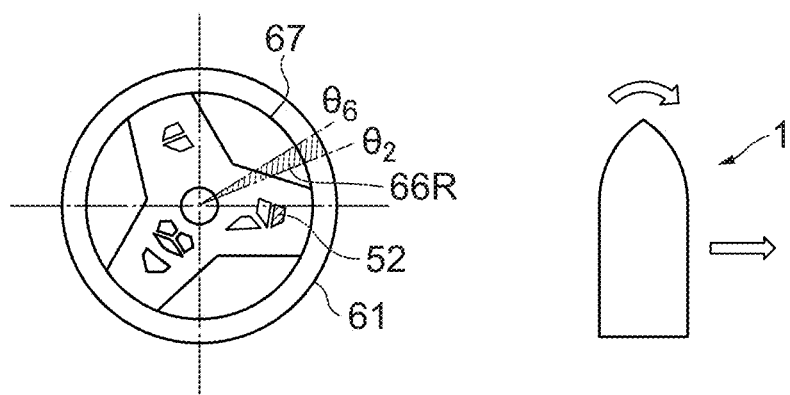
FIGS. 13A to 13D are figures for explaining shifting from a lateral movement mode to the pivot turning mode according to the third preferred embodiment of the present invention.

First, as shown in FIG. 13A, in the case in which the rotation angle of the wheel portion 61 is equal to or smaller than the rotation angle θ6 and the reference position 67 of the wheel portion 61 has not reached the pivot turning region 66R, the controller 40 turns the bow of the hull 2 to the right in response to the rotation angle of the wheel portion 61 while moving the marine vessel 1 in the right lateral direction.

Figure 13B:
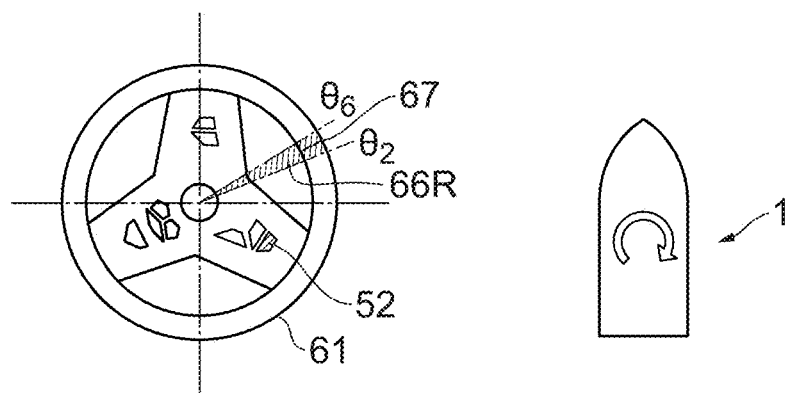

On the other hand, as shown in FIG. 13B, in the case in which the rotation angle of the wheel portion 61 becomes larger than the rotation angle θ6 and the reference position 67 is included in the pivot turning region 66R, the controller 40 stops moving the marine vessel 1 in the right lateral direction, and shifts the marine vessel 1 to the pivot turning mode. At this time, the marine vessel 1 rotates around the center of gravity G in response to the rotation operation of the wheel portion 61 (see an arrow in FIG. 13B).

Figure 13C:
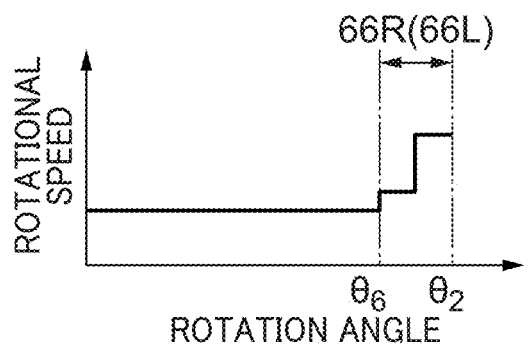
Figure 13D:
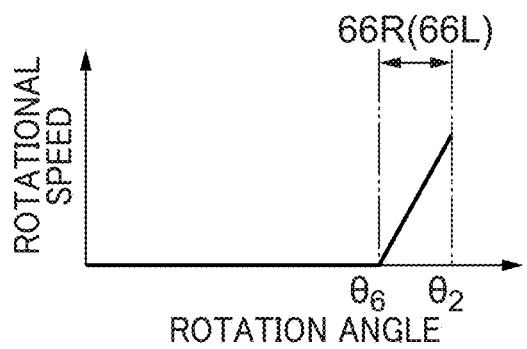

Moreover, in the pivot turning region 66R (66L), the turning speed of the marine vessel 1 does not need to be constant. For example, as shown in FIG. 13C, in the pivot turning region 66R (66L), the magnitude of the turning speed of the marine vessel 1 may be set in two stages, and the turning speed of the marine vessel 1 may be set to increase as the rotation angle of the wheel portion 61 increases. Furthermore, as shown in FIG. 13D, in the pivot turning region 66R (66L), the turning speed of the marine vessel 1 may be set to increase in proportion to the magnitude of the rotation angle of the wheel portion 61.

Although the case in which the wheel portion 61 is rotated clockwise from the straight-ahead state has been described with reference to FIGS. 13A to 13D, the same processes are performed in the case in which the wheel portion 61 is rotated counterclockwise from the straight-ahead state.

In the third preferred embodiment, even in the low-speed mode, only when the wheel portion 61 is rotated while the left lateral movement switch 51 or the right lateral movement switch 52 is operated, the marine vessel 1 shifts to the pivot turning mode, and in the case in which the marine vessel user does not want to shift to the pivot turning mode, the marine vessel user just needs to stop operating the left lateral movement switch 51 or the right lateral movement switch 52 while the wheel portion 6 is being rotated.

According to the third preferred embodiment, when the wheel portion 61 is rotated to the pivot turning region 66R (66L) while the left lateral movement switch 51 or the right lateral movement switch 52 is being operated, since the controller 40 shifts the marine vessel 1 from the lateral movement mode to the pivot turning mode, it is possible to shift the marine vessel 1 to the pivot turning mode without stopping the rotation operation of the wheel portion 61. In addition, since the left lateral movement switch 51 or the right lateral movement switch 52 is located at the position where it is able to be operated by the finger of the marine vessel user who is gripping the wheel portion 61, it is possible to shift the marine vessel 1 to the pivot turning mode without the marine vessel user taking his/her hand off the wheel portion 61. Therefore, it is possible to improve the operability when shifting the marine vessel 1 to the pivot turning mode.

Moreover, in the third preferred embodiment, since the marine vessel 1 does not shift to the pivot turning mode unless the marine vessel user makes the wheel portion 61 reach the pivot turning region 66R (66L) while operating the left lateral movement switch 51 or the right lateral movement switch 52, in order to shift the marine vessel 1 to the pivot turning mode, the marine vessel user needs to consciously operate the left lateral movement switch 51 or the right lateral movement switch 52. Therefore, it is possible to prevent the marine vessel 1 from shifting to the pivot turning mode against the intention of the marine vessel user.

Although preferred embodiments of the present invention have been described above, the present invention is not limited to the above-described preferred embodiments, and various modifications and changes can be made within the scope of the gist thereof.

For example, in the first preferred embodiment, although the controller 40 shifts the marine vessel 1 to the pivot turning mode when the wheel portion 19 is rotated to the high friction region 33R (33L), the mode to be shifted to is not limited to the pivot turning mode. For example, when the wheel portion 19 is rotated to the high friction region 33R (33L), the controller 40 may shift the marine vessel 1 to the lateral movement mode or the pressing mode (a predetermined movement mode).

Further, although the marine vessel maneuvering system according to each of the above-described preferred embodiments is applied to the marine vessel 1 including the marine vessel propulsion devices 4L and 4R and the engines 3L and 3R that are housed in the hull 2, there is no limitation on the type of the marine vessel 1 to which the marine vessel maneuvering system may be applied. The marine vessel maneuvering system according to a preferred embodiment of the present invention may be applied to the planing boat 42 including the outboard motors 41R and 41L which is shown in FIG. 8, or may be applied to a marine vessel including inboard/outboard motors.

Furthermore, although the marine vessel 1 is equipped with the engines 3L and 3R as power sources, the marine vessel 1 may include electric motors as the power sources instead of the engines 3L and 3R, or may include both engines and electric motors as the power sources.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A marine vessel maneuvering system comprising:
   a rotatable operator to maneuver a marine vessel; and
   a controller configured or programmed to shift to a pivot turning mode in which the marine vessel is turned on the spot; wherein in a rotation operation direction of the operator, a high friction region where a resistance of a rotation operation increases is set within a rotatable range of the operator; and
when the operator is rotated to the high-friction region, the controller is configured or programmed to shift the marine vessel to the pivot turning mode.

2. The marine vessel maneuvering system according to claim 1, wherein the controller is configured or programmed to increase a turning speed of the marine vessel in the pivot turning mode as a rotation angle of the operator increases in the high friction region.

3. The marine vessel maneuvering system according to claim 2, wherein the controller is configured or programmed to increase the resistance of the rotation operation as the rotation angle of the operator increases in the high friction region.

4. The marine vessel maneuvering system according to claim 1, wherein, when the marine vessel has shifted to a low-speed mode and the operator is rotated to the high-friction region, the controller is configured or programmed to shift the marine vessel to the pivot turning mode.

5. The marine vessel maneuvering system according to claim 1, further comprising:
a notifier; wherein
when the marine vessel shifts to the pivot turning mode, the notifier is operable to notify a marine vessel user that the marine vessel has shifted to the pivot turning mode.

6. The marine vessel maneuvering system according to claim 1, further comprising:
a cancel switch to cancel the shift to the pivot turning mode; wherein
when the cancel switch is operated, the controller is configured or programmed to eliminate the high friction region.

7. The marine vessel maneuvering system according to claim 1, wherein
in the high friction region, when the operator is rotated so that the rotation angle increases, the resistance of the rotation operation increases; and
when the operator is rotated so that the rotation angle decreases, the resistance of the rotation operation does not increase.

8. The marine vessel maneuvering system according to claim 1, wherein
in the high friction region, when the operator is rotated so that the rotation angle increases or decreases, the resistance of the rotation operation increases.

9. The marine vessel maneuvering system according to claim 1, wherein the operator includes a steering apparatus.

10. The marine vessel maneuvering system according to claim 1, wherein the operator includes a joystick.

11. A marine vessel maneuvering system comprising:
a rotatable operator to maneuver a marine vessel; and
a controller configured or programmed to shift to a pivot turning mode in which the marine vessel is turned on the spot; wherein
the operator includes a lateral movement switch to shift the marine vessel to a lateral movement mode which moves the marine vessel in a lateral direction; and
when the operator is rotated by a predetermined rotation angle or more while the lateral movement switch is operated, the controller is configured or programmed to shift the marine vessel to the pivot turning mode.

12. The marine vessel maneuvering system according to claim 11, wherein, after the operator is rotated by the predetermined rotation angle or more, the controller is configured or programmed to increase a turning speed of the marine vessel in the pivot turning mode as a rotation angle of the operator increases.

13. The marine vessel maneuvering system according to claim 11, wherein
the operator includes a steering apparatus;
the steering apparatus includes a central portion rotatably supported with respect to a hull of the marine vessel, a handle portion that is gripped by a marine vessel user, and spoke portions that connect the central portion and the handle portion; and
the lateral movement switch is located on one of the spoke portions at a position where the lateral movement switch is able to be operated by a finger of a hand of the marine vessel user that is gripping the handle portion.

14. A marine vessel maneuvering system comprising:
a rotatable operator to maneuver a marine vessel; and
a controller configured or programmed to shift the marine vessel to a predetermined movement mode; wherein
in a rotation operation direction of the rotatable operator, a high friction region where a resistance of a rotation operation increases is set within a rotatable range of the operator; and
when the operator is rotated to the high-friction region, the controller is configured or programmed to shift the marine vessel to the predetermined movement mode.

15. A marine vessel comprising:
a rotatable operator to maneuver the marine vessel; and
a controller configured or programmed to shift to a pivot turning mode in which the marine vessel is turned on the spot; wherein
in a rotation operation direction of the operator, a high friction region where a resistance of a rotation operation increases is set within a rotatable range of the operator; and
when the operator is rotated to the high-friction region, the controller is configured or programmed to shift the marine vessel to the pivot turning mode.

16. A marine vessel comprising:
a rotatable operator to maneuver the marine vessel; and
a controller configured or programmed to shift to a pivot turning mode in which the marine vessel is turned on the spot; wherein
the operator includes a lateral movement switch to shift the marine vessel to a lateral movement mode which moves the marine vessel in a lateral direction; and
when the operator is rotated by a predetermined rotation angle or more while the lateral movement switch is operated, the controller is configured or programmed to shift the marine vessel to the pivot turning mode.

17. A marine vessel comprising:
a rotatable operator to maneuver the marine vessel; and
a controller configured or programmed to shift the marine vessel to a predetermined movement mode; wherein
in a rotation operation direction of the operator, a high friction region where a resistance of a rotation operation increases is set within a rotatable range of the operator; and
when the operator is rotated to the high-friction region, the controller is configured or programmed to shift the marine vessel to the predetermined movement mode.

* * * * *